US012367870B2

(12) United States Patent
Grossmann et al.

(10) Patent No.: US 12,367,870 B2
(45) Date of Patent: Jul. 22, 2025

(54) REAL-TIME NATURAL LANGUAGE PROCESSING AND FULFILLMENT

(71) Applicant: SoundHound AI IP, LLC, Santa Clara, CA (US)

(72) Inventors: Jon Grossmann, Cupertino, CA (US); Robert Macrae, Mountain View, CA (US); Scott Halstvedt, Santa Clara, CA (US); Keyvan Mohajer, Los Gatos, CA (US)

(73) Assignee: SoundHound AI IP, LLC, Santa Clara, CA (US)

( * ) Notice: Subject to any disclaimer, the term of this patent is extended or adjusted under 35 U.S.C. 154(b) by 249 days.

(21) Appl. No.: 18/055,821

(22) Filed: Nov. 15, 2022

(65) Prior Publication Data

US 2024/0161737 A1 May 16, 2024

(51) Int. Cl.
*G10L 15/18* (2013.01)
*G06F 3/16* (2006.01)
(Continued)

(52) U.S. Cl.
CPC .......... *G10L 15/1815* (2013.01); *G06F 3/167* (2013.01); *G06F 40/30* (2020.01); *G10L 15/22* (2013.01)

(58) Field of Classification Search
CPC . G10L 15/1815; G10L 15/22; G10L 15/1822; G10L 15/08; G06F 3/167;
(Continued)

(56) References Cited

U.S. PATENT DOCUMENTS

2016/0188565 A1* 6/2016 Robichaud .............. G06F 40/35
704/9
2020/0251098 A1* 8/2020 Metallinou ............. G10L 15/02
(Continued)

OTHER PUBLICATIONS

Bos, Johan, Ewan Klein, Oliver Lemon, and Tetsushi Oka. "Dipper: Description and formalisation of an information-state update dialogue system architecture." In Proceedings of the Fourth SIGdial Workshop of Discourse and Dialogue, pp. 115-124. 2003.
(Continued)

*Primary Examiner* — Yogeshkumar Patel
(74) *Attorney, Agent, or Firm* — Pearl Cohen Zedek Latzer Baratz LLP

(57) ABSTRACT

A system and method of real-time feedback confirmation to solicit a virtual assistant response from an evolving semantic state of at least a portion of an utterance. A user accesses a virtual assistant on an electronic device having the system and/or method configured to capture a command, a question, and/or a fulfillment request from audio such as, the speech emitted from the speaking user. The speech may be intercepted by a speech engine configured to transcribe the speech into text that is matched with the fragment pattern's regular expression to generate a fragment and/or the speech may be processed with a machine learning model to identify fragments. The fragments are identified by a domain handler configured to update a data structure of the current semantic state of the utterance in real-time on an interface of an electronic device.

34 Claims, 29 Drawing Sheets

(51) Int. Cl.
*G06F 40/30* (2020.01)
*G10L 15/22* (2006.01)

(58) Field of Classification Search
CPC ...... G06F 40/30; G06F 40/205; G06F 40/289; G06F 40/35
See application file for complete search history.

(56) References Cited

U.S. PATENT DOCUMENTS

| | | | |
|---|---|---|---|
| 2021/0082412 A1* | 3/2021 | Kennewick | G10L 13/08 |
| 2022/0245360 A1* | 8/2022 | Galitsky | G06F 16/36 |
| 2022/0246139 A1 | 8/2022 | Metallinou et al. | |

OTHER PUBLICATIONS

Ferguson, George, and James F. Allen. "Trips: An integrated intelligent problem-solving assistant." In Aaai/Iaai, pp. 567-572. 1998.

Kopp, Stefan, Herwin van Welbergen, Ramin Yaghoubzadeh, and Hendrik Buschmeier. "An architecture for fluid real-time conversational agents: integrating incremental output generation and input processing." Journal on Multimodal User Interfaces 8, No. 1 (2014): 97-108.

Lemon, Oliver, Anne Bracy, Alexander Gruenstein, and Stanley Peters. "Information states in a multi-modal dialogue system for human-robot conversation." In 5th Workshop on Formal Semantics and Pragmatics of Dialogue (Bi-Dialog 2001), pp. 57-67. 2001.

Traum, David, David DeVault, Jina Lee, Zhiyang Wang, and Stacy Marsella. "Incremental dialogue understanding and feedback for multiparty, multimodal conversation." In International Conference on Intelligent Virtual Agents, pp. 275-288. Springer, Berlin, Heidelberg, 2012.

* cited by examiner

REAL-TIME NATURAL LANGUAGE PROCESSING AND FULFILLMENT

BACKGROUND

Conventional natural language understanding system techniques update at the end of each sentence after the entire sentence statement is identified as a unit. For example, some natural language understanding technologies interpret the meaning of the entire length of a sentence after the completion of the entire sentence statement is received by the system. Currently, techniques utilized for computing a change to semantic state of a system, as a result of an utterance, only occurs when detecting an end of an utterance.

SUMMARY

Methods for processing a fragment in a natural language understanding environment for both a computer-implemented method and/or a computer-readable medium comprising instructions which when executed by a computer, cause the computer to carry out the steps of the method are described. An embodiment includes using a speech engine to perform acoustic speech recognition. The speech engine produces a continuous transcription of the speech. For example, a user accesses a virtual assistant using an electronic device having a visual display configured to capture a command, a question, and/or a fulfillment request from the audio including, but not limited to, speech of a user. Although an embodiment includes continuous transcription, in some embodiments, the transcription can be substantially continuous, intermittent, and/or have a delay and/or a pause.

In an embodiment, transcription of audio is inferred by a speech engine. A speech engine is configured to receive input speech and generate a text transcription. In particular, a speech engine is configured to transcribe at least a portion of the speech, including, but not limited to, a fragment of a sentence, a word, at least a portion of a word, and/or at least a portion of an utterance. The system uses a speech engine to transcribe audio to text forming a transcription. Fragments are then sent to a fragment integrator. Rules of the fragment integrator defines a sequence of fragments that the fragment integrator should look for, and the rule includes what message and/or messages to output if the rule is matched.

The fragment integrator either sends the raw fragments to the domain handler or the integrator will match a rule with a sequence of fragments and fire the rule to send a message to a domain handler. The system's context relevance combined with fragment parsing causes the semantic state to be updated to incorporate commands spoken so far. As a result, mid-utterance updates to context enables suggestions to the user of how to complete their thought, therefore complete the sentence that the user is in the middle of.

In another embodiment, a simple system without fragment integration may be used as long as the application only depends on the raw stream of fragments. For example, it is possible in some implementations to not have a fragment integrator. As a result, the fragments are sent directly to the domain handler. The domain handler outputs its continuously updated semantic state, which is the accumulated semantic understanding of the utterance processed thus far.

A database is provided. The database contains fragment patterns. Fragment patterns are short segments of text. Fragment patterns may be compared to at least one word of a transcription and the resultant fragments are recognized and generated by a fragment identifier. It is within the scope of this invention for a fragment identifier to include, but not be limited to, a sequence-to-sequence neural network, which is a common machine learning model. The fragment identifier infers fragments directly from audio.

A sequence of at least one word from a transcript of at least a portion of a user's utterance that matches a fragment pattern's regular expression may form a fragment. Fragments in the transcription, as short as a portion of one word, are identified as 'fragments' by a fragment identifier. It is within the scope of this invention for a sequence of at least one word in the transcription to have at least one word being identified as a 'fragment' of text by a fragment identifier. For example, the fragment identifier recognizes text from the transcription and associates them with an intent to output a fragment to be identified by a domain handler. For example, a word and/or a combination of words not recognized as 'fragments' are ignored. Some examples of fragments are "classic cheeseburger" or "one dozen" or "chocolate brownie bar" which could be matched by the fragment identifier using fragment patterns such as:

a. (["classic"]("cheeseburger"|"hamburger")
b. "twelve"|"dozen"|"one dozen"
c. (["chocolate"].(("brownie".["bar"|"bars"])|"brownies"))

The fragments are processed immediately and/or simultaneously as they are identified by a 'domain handler' that updates a data structure representing the current semantic state of a long form utterance that may still be in progress. In this way utterance understanding takes place incrementally based on the identified fragments rather than all at once at the end of a short utterance. Some examples of variables and legal values in the semantic state data structure are:

a. INTENT=DELETE, FLAVOR=chocolate, ITEM=shake
b. INTENT=CHANGE, TARGET=first_item, ITEM=cheeseburger, TOPPING=onions
c. INTENT=ADD, SIZE=large, ITEM=fries, TOPPING=chili Aspects of the semantic state represented in the domain handler may be streamed to the user in real-time. This can be used to demonstrate to the user, mid-utterance and/or when at least a portion of an utterance is detected by the system, and/or any time prior to the completion of the utterance, that the system's understanding is correct. If the system's understanding is not correct, the user is alerted quickly so they may make adjustments. It is within the scope of this invention for a mid-utterance to not be limited to a specific percentage of an utterance. The detection of at least a portion of an utterance may begin starting from the beginning of the vocalization of at least a portion of an utterance by a user and anytime ending after the beginning, whereby, the system is capable of detecting a fragment.

The semantic state represented by the domain handler may be used to act on the intent or partial intent as already understood, while the user is still mid-utterance.

Alternatively, the domain handler could simply process all fragments immediately taking immediate action, depending on the application, and have little or no semantic state that is updated. An example would be a series of several commands in one utterance where each subcommand is sorted from fragments and processed immediately without semantic state tracking.

The fragments may be additionally processed by a fragment integrator before the fragments are processed by the domain handler. The fragment integrator will wait and/or pause prior to sending fragments to the domain handler until the fragment integrator has a chance to identify subsequent fragment changes and/or to disambiguate the meaning or intent of the user. When such a sequence is detected, the fragments may be modified, deleted, and/or processed in a different order. Further, additional messages may be inserted before they are sent to the domain handler in order to clarify the meaning of the collection of fragments.

The semantic state, with the outcomes of the domain handler, can then influence or bias subsequent transcriptions by the acoustic speech recognition in the initial step and in further steps. Such a context-dependent influence, based on the evolving semantic state in the domain handler, can be used to improve accuracy of the evolving transcription by biasing acoustic or language scores used by the speech engine and/or by some other related means. This is an improvement over conventional techniques that would only update at the end of each utterance after it is understood as a unit.

Additional Description

It is within the scope of this invention for at least one word to be formed from at least one character including, but not limited to, a letter, a numerical digit, an alphanumeric character, a common punctuation mark such as "." and/or "-", whitespace.

It is within the scope of this invention for an alphanumeric character to consist of both a letter and a number and/or other symbol including, but not limited to, a punctuation mark and/or a mathematical symbol.

It is within the scope of this invention for audio to include, but not be limited to, an utterance, speech, a spoken word, a statement, and/or a vocal sound.

In some embodiments, the domain handler maintains a conversation state data structure. Whereas a semantic state data structure can include many items of the same or different types, conversation state stores the most recently reference entity for any type. This is useful for functions such as disambiguating pronouns. Conversation state is also more volatile in that values become stale over time as the conversation moves on. Some embodiments remove values from conversation state after specific periods of time.

The domain handler, conversation state change, and/or semantic state change can cause an update and/or change to a display in real time as a result of matching a fragment in the transcription to a fragment pattern. It is within the scope of this invention for a display to signal to a user the status of the output of the domain handler including, but not be limited to, a visual display, a vibration, a light emitting unit, a mechanical activation, and/or auditory feedback. In an example, auditory feedback may be a phrase such as "uh huh" and/or any appropriate non-verbal signal. For example, a visual display may be part of an electronic device having a user interface having for example, a text message visible to a user on a screen of the user interface. In another example, a display may be a plurality of light emitting units configured to illuminate in a predetermined manner according to a status update. In yet another example, a display may be a series of vibrations corresponding to a status update. In another example, an update may be displayed as an audio output, such as one using Text-to-Speech (TTS). In an example, the displayed update may also cause a motor to move, such as one that adjusts the position of a robotic arm. In an example, the displayed update may be a virtual motion in a simulation such as a video game and/or a virtual reality environment such as the Metaverse.

Some examples of electronic devices include mobile devices such as automobiles, portable devices such as smartphones, tablet, and notebook computers, stationary devices such as kiosks and vending machines, and appliances such as refrigerators and water coolers.

It is within the scope of this invention for speech to include, but not be limited to, articulate and/or inarticulate sounds.

It is within the scope of this invention for an automatic speech recognition engine to include, but not be limited to, a machine learning model and/or a neural network configured to uniquely map input from including, but not limited to, a word, at least a portion of a word, at least a portion of an utterance, a sentence, a fragment, text, audio, and/or video to an output including, but not limited to, a transcription, an identified fragment, and/or an interpretation data structure.

A fragment pattern can be representations such as, plain text and/or a regular expression, and the particular text that matches the fragment pattern's regular expression is the 'fragment'. Each regular expression fragment pattern can match one or more actual sequences of words. The actual sequence matched is the fragment. A fragment can be as little as at least a portion of one word. Fragments can have slots that can be filed by values that vary from one instance to another of invoking the same fragment.

The domain handler can update a semantic state. The domain handler can update a conversation state data structure with information from the fragment. In another embodiment, the domain handler can interact with a dialog manager. The dialog manager has both a conversation state, which tracks things such as entity values needed to disambiguate pronouns, and a semantic state, such as the listing of items in a shopping cart of elements shown in a visual display. In an example of a disambiguating pronoun, if there are five items in the shopping cart and a user states, "delete it", the scope of the deleted item will be limited to the single most recently mentioned item.

The domain handler takes in a 'fragment'. In an example, the fragments "change that", "make that", "replace that", "instead of that" all map to the fragment "INTENT.MODIFY". A domain handler is capable of taking multiple types of inputs, although in practice a software engineer may decide to create an abstraction object that covers all types of input, or they give the domain handler an interface for accepting different types of messages. For example, three types of messages the domain handler may receive include, but are not limited to, 1) 'raw' fragments that the Integrator simply passes through, 2) messages from the fragment integrator that are sent when the fragment integrator detects a language pattern that it has a rule for, 3) a natural language understanding data structure, representing the semantic information of a whole sentence.

Examples of the three types of messages the domain handler may receive:
1) INTENT.MODIFY
2) MODIFY target=second_item option=mustard action=add
3) INTENT=info_question, TOPIC=dessert_menu The fragment identifier identifies the fragments and knows their associated fragment which is passed to the fragment integrator who then either passes the raw fragments to the domain handler or composes other messages to pass to the domain handler.

The fragment integrator is configured to detect a pattern such as "add OPTION to the ITEM" (where OPTION is a fragment such as "TOPPING.MUSTARD" that matched the fragment "mustard", and ITEM is a fragment such as "ITEM.CHEESEBURGER") and the integrator will match that rule to incoming fragments and output to the domain handler a message or series of messages to effect, in this case, adding a topping to a menu item.

Some embodiments include a further step of analyzing the transcription using sentence-level natural language understanding. This occurs in parallel with the text fragment identifier. Just before the domain handler is an arbitrator that selects between fragments (or an edited fragment stream) and/or an interpretation resulting from natural language understanding. The arbitrator chooses the natural language understanding result if the natural language understanding function indicates a successful interpretation of the transcription. The arbitrator takes three types of input: natural language understanding data structure, a summary message from the integrator when the integrator matches a rule, or a raw fragment. Both the arbitrator and the domain handler need to know how to process all three types of messages. The arbitrator passes through its input if it receives only one type of input without having received another type within a particular time period, otherwise, with two or more inputs within the same time period, the arbitrator selects which among them is output to the Domain Handler. Whatever is selected for output is not transformed. For example, the arbitrator decides which one of the full-sentence natural language understanding result or the fragment integrator natural language understanding result is processed by the domain handler.

In an embodiment, a separate algorithm may be used to identify entire utterances or sentences, for example, by looking for a question word as the start of a sentence and looking for a pause as the end of a sentence. Using a full-utterance level natural language understanding engine to generate a natural language understanding interpretation. A decision process in the arbitrator may choose whether to utilize the full-utterance level natural language understanding result or to process the fragment-level natural language understanding result. For example, a natural language understanding result that failed to understand the utterance would be discarded and the fragment-level natural language understanding response used instead.

In another embodiment, analyzing the transcription is done to identify sequences of tokens that are hypothesized to be full-sentence utterances which are then processed by full-utterance natural language understanding. More generally, any extended sequence of tokens may be identified whether forming a single or multiple sentences, even potentially less than a sentence, such as an entire sentence clause. An example would be looking for question words, either by doing explicit token matching or by capturing question words as fragments, and then looking for a pause, and sending the token sequence from the question word to the pause to the full-sentence natural language understanding. Then, after receiving the full-sentence natural language understanding response, the arbitrator can look at it to decide if it should be used or discarded. A "didn't get that" response would be an example of a result to discard from full-utterance natural language understanding. An arbitrator implements decision logic to decide whether to use the full-utterance level natural language understanding result, or to use the fragment-level results for that portion of the incoming token sequence, where a sequence of transcribed words is a token sequence.

To determine the word sequence in which to apply natural language understanding, some embodiments use heuristics such as identifying question words such as "what", "when", "where", and/or "who" and/or pauses in a detected voice within the audio.

Some embodiments have an arbitrator that includes other inputs such as text input directly without using a speech engine and other input modalities.

An additional type of output in some embodiments is speech audio synthesized using text-to-speech (TTS). In some such embodiments, speech output is generated from a message in the interpretation from natural language understanding.

With or without parallel sentence-level natural language understanding, some embodiments include a dialog manager that may also control the conversation. For example, "If the system needs to know additional information such as, the type of cheese for an item, a user is prompted for additional information such as including, but not limited to, the cheese type and/or a delivery address. Embodiments with an arbitrator and/or dialog manager may use the dialog manager to select between different arbitration results to be sent to the domain handler.

A dialog manager can perform other functions such as composing follow-up questions to request information from a user to complete a change to the semantic state.

Fragment Integration

Parsing is eager, but the intention or interpretation of current fragments can change with future words.

For example:
"delete that" (intends to delete the immediately prior mentioned item, retrieved from conversation state)
"delete that <item>" (intends to search the semantic state for the <item> and delete it)

Pauses from the user may be used to disambiguate multiple possible interpretations for fragments. It is possible to avoid acting on fragments whose meaning might be disambiguated by future fragments by waiting for a pause or future fragments that clarify meaning. The fragments are not processed by the domain handler until enough information is acquired to disambiguate meaning. If a new word or fragment is added to the transcription before the pause elapses that changes the meaning of previous fragments, then a decision can be made for the domain handler to act on the new context provided by the longer sequence of fragments instead.

For example, for fragments "give me" followed by "a large", the fragment integrator must wait before adding an item to the order because there can be multiple items with large as an option such as Coke, coffee, or fries. In another example, following the fragments "give me", "pizza", and "mushrooms", a fragment integrator can wait for a period of time before invoking the domain handler to add the pizza to the semantic state. This is because a pizza may have a list of toppings. The fragment integrator only proceeds after a period of time after which a user would probably have finished their sentence without intending to add other items besides mushrooms.

The lookahead delay may be based on a user's speech speed. The lookahead delay may be calculated by dividing a number of words by a period of time of speech, analyzing inter-word delay, and/or analyzing a period of time between an identified beginning and end of one or more words.

Slot Inference

When the transcription matches the beginning of a fragment that includes a slot, the domain handler may invoke a semantic completion handler that displays a list of known possible slot values. The list is removed once the fragment is matched and sent to the handler. For example, following the fragments "give me" and "combo meal", the domain handler might display a list of items that can be part of a combo meal such as sandwiches, side dishes, and beverages.

Semantic Completion

A fragment-level natural language understanding system processes the semantics of an utterance in real-time, that is, during the utterance rather than after it is completed. The system maintains a continuously updated semantic state of the evolving partial utterance. This semantic state of the system can be used to provide suggestions that are semantically relevant at each word of the utterance. This is in contrast to conventional systems that provide an autocomplete suggestion feature based only on the word sequence rather than the semantics. For example, the partial utterance "for the first item add" would generate different suggestions based on what the "first item" actually refers to. Therefore, there are different possible suggestions for the identical sequence of words depending on context. Another example, during the phrase "Add a hamburger with ketchup and without mustard", there are different semantically relevant suggestions at different points of the utterance. After the first two words, "Add a", the suggestions could be menu items that are not yet in the cart, while after the word "with" the suggestions might be hamburger toppings that are not yet already selected. Similarly, after the word "without" the suggestions would be limited to toppings that are already selected.

For example: With "I'd like . . . ", semantic completion shows popular items or items previously ordered by the current user. If there is a chocolate donut in the cart and the user says "give me a chocolate . . . ", a shake is shown to the user since there is already a chocolate donut in the cart. However, if the user says "another chocolate . . . ", the added item is conditional on the word "another", which causes a chocolate donut to be shown instead of a chocolate shake.

In an embodiment, the computer-implemented method is implemented by simple matching of transcription text to a list of trigger phrases and associated functions including, but not limited to, displaying a list of menu items and/or displaying a list of options for the most recent menu item in semantic state.

It is within the scope of this invention for an alternate embodiment to have any individual including, but not limited to, a system developer to define functions based on variable values stored in the semantic state data structure. The system calls the functions at run time and/or as a pre-compiled executable and performs semantic completion according to the system developer's definition.

End-to-End Audio Recognition

Methods for processing a fragment in a sequence-to-sequence neural network for both a computer-implemented method and/or a computer-readable medium comprising instructions which when executed by a computer, cause the computer to carry out the steps of the method are described. Although it is within the scope of this invention for the method to be configured for use with a full vocabulary speech engine, it is envisioned in an alternate embodiment of the method to be configured for use with a partial and/or at least a portion of a vocabulary speech engine. For example, the method may not use a full vocabulary speech engine. Instead, the method uses one or more key phrase spotters. These could be implemented as including, but not limited to, a statistical model such as a neural network equivalent, a machine learning model, and/or other signal processing designs capable of semantic text comparison. The key phrase spotter takes in audio data and outputs a probability of each of the key phrases that would cause a fragment parser to invoke a domain handler. When a probability exceeds a threshold for a key phrase, the system calls the domain handler.

It is within the scope of this invention for a recognizer capable of being trained or designed specifically for a given set of possible commands to handle, such as, "make that American cheese" to change the cheese type of a hamburger. It is also within the scope of this invention to implement a recognizer that recognizes phrases with slot values such as "change <X> to <Y>". A separate recognizer or large vocabulary speech engine could recognize slot values (for X and Y).

The neural network directly outputs a fragment message. Whereas a fragment is the actual words matched to the "fragment pattern", a fragment pattern maps to a message. The message is processed by the domain handler.

In another embodiment, the method comprises receiving ongoing speech. For example, a user is speaking during an ordering process. The semantic state may be updated interactively according to the ongoing speech. For example, the system will interact with an utterance even before the end of the utterance, such as mid-sentence. Reflecting the semantic state interactively in a user-visible interface is an embodiment that signals the intent of a user on their electronic device, such as including, but not limited to, a tablet and/or a smartphone. For example, the system interacts with ongoing speech in intervals, and/or during intermittent and/or continuous monitoring throughout the entire sentence as opposed to only at the end of a sentence.

In another embodiment, the semantic state represents an order comprising an item and/or a plurality of items from a menu or a list of items. For example, a consumer may have placed an order for goods and/or services.

In another embodiment, the item and/or a plurality of items from a menu or a list of items may have a qualifier. Such a qualifier may include, but not be limited to, a flavor, a topping, a size, and/or a side item, which itself may include qualifiers recursively.

In another embodiment, the method comprises receiving a portion of a transcription. A fragment and/or a plurality of fragments in the transcription are identified. Understanding the fragments by matching the fragment to a fragment pattern. The fragments have semantic meaning. The semantic state of the system is updated in real-time as the sentence is processed fragment-by-fragment. A display, such as a visual display, is updated to show a user the semantic state of their speech. For example, if a consumer places an order for three items, each of the three items will appear in a shopping cart of the consumer's display in real-time as each item is spoken and detected by the system.

These and other important objects, advantages, and features of the invention will become clear as this description proceeds.

The figures depict various embodiments of the present invention for purposes of illustration only. One skilled in the art will readily recognize from the following description that other alternative embodiments of the structures and methods illustrated herein may be employed without departing from the principles of the invention described herein.

DETAILED DESCRIPTION

Figure 1:
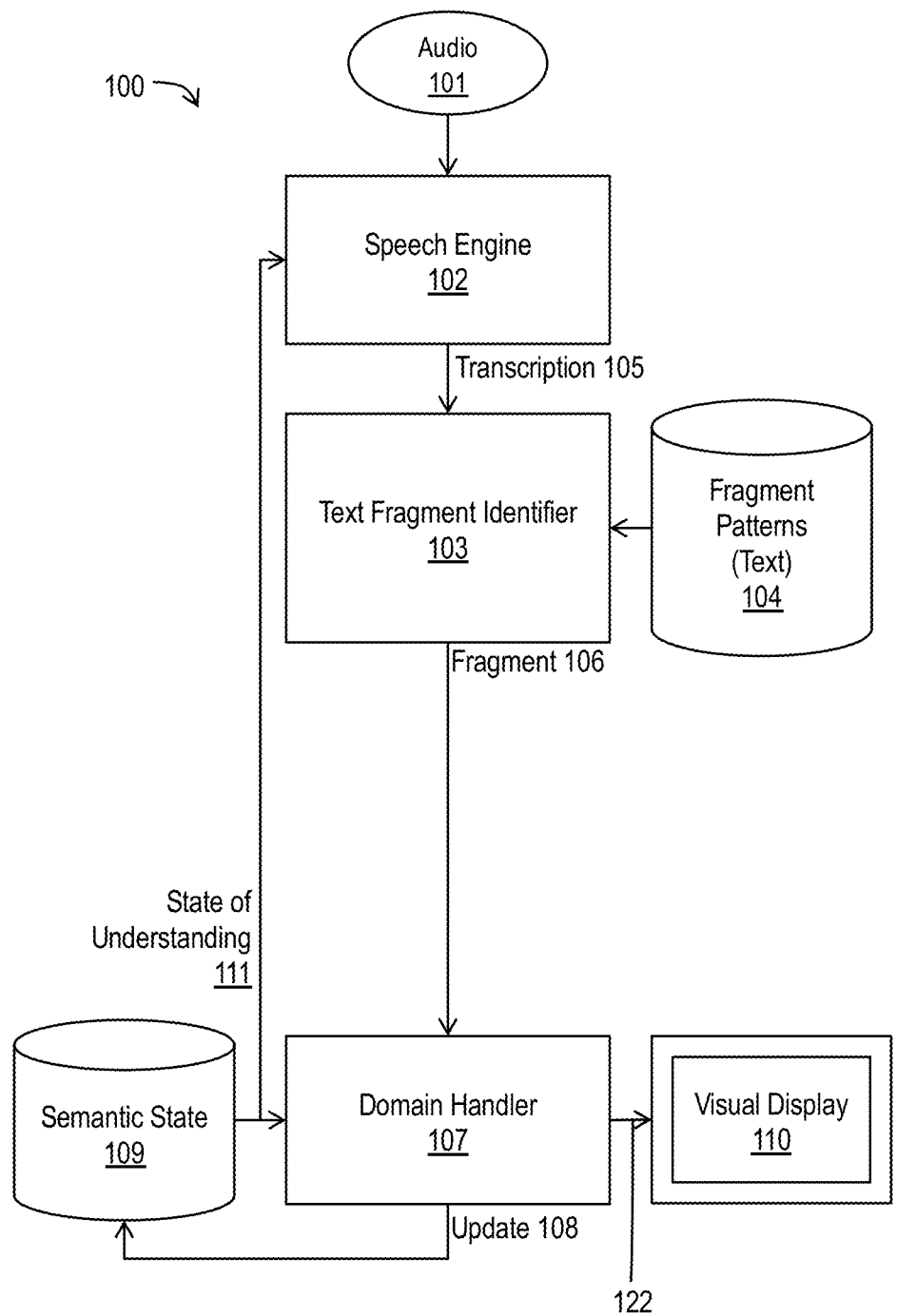
FIG. 1 is a high-level block diagram illustrating the system for the natural language understanding environment of updating a display in real time based on detection of the presence of text fragments in a speech transcription.

FIG. 1 is a block diagram of system 100 for the natural language understanding environment of updating a display in real time based on detection of a presence of fragments within a transcription of speech in real time. System 100 may include audio 101, a speech engine 102, a text fragment identifier 103, and domain handler 107. Speech engine 102 produces a continuous transcription 105 of the speech. Sequences of words in transcription 105 as short as one word are identified as a fragment or fragments 106 by text fragment identifier 103. Fragment pattern 104 is a database of regular expressions. The text from transcription 105 that matches the regular expression of fragment pattern 104 is fragment 106. Fragments 106 are processed immediately as they are identified by domain handler 107. Domain handler 107 continuously updates 108 semantic state 109. The accumulated state of understanding 111 of the utterance is an output of the updated semantic state 109. Domain handler 107 can cause visual display 110 to update 122 in real time when domain handler 107 processes fragment 106 immediately. Semantic state 109 change can cause a display update, such as an update to visual display 110.

Figure 1A:
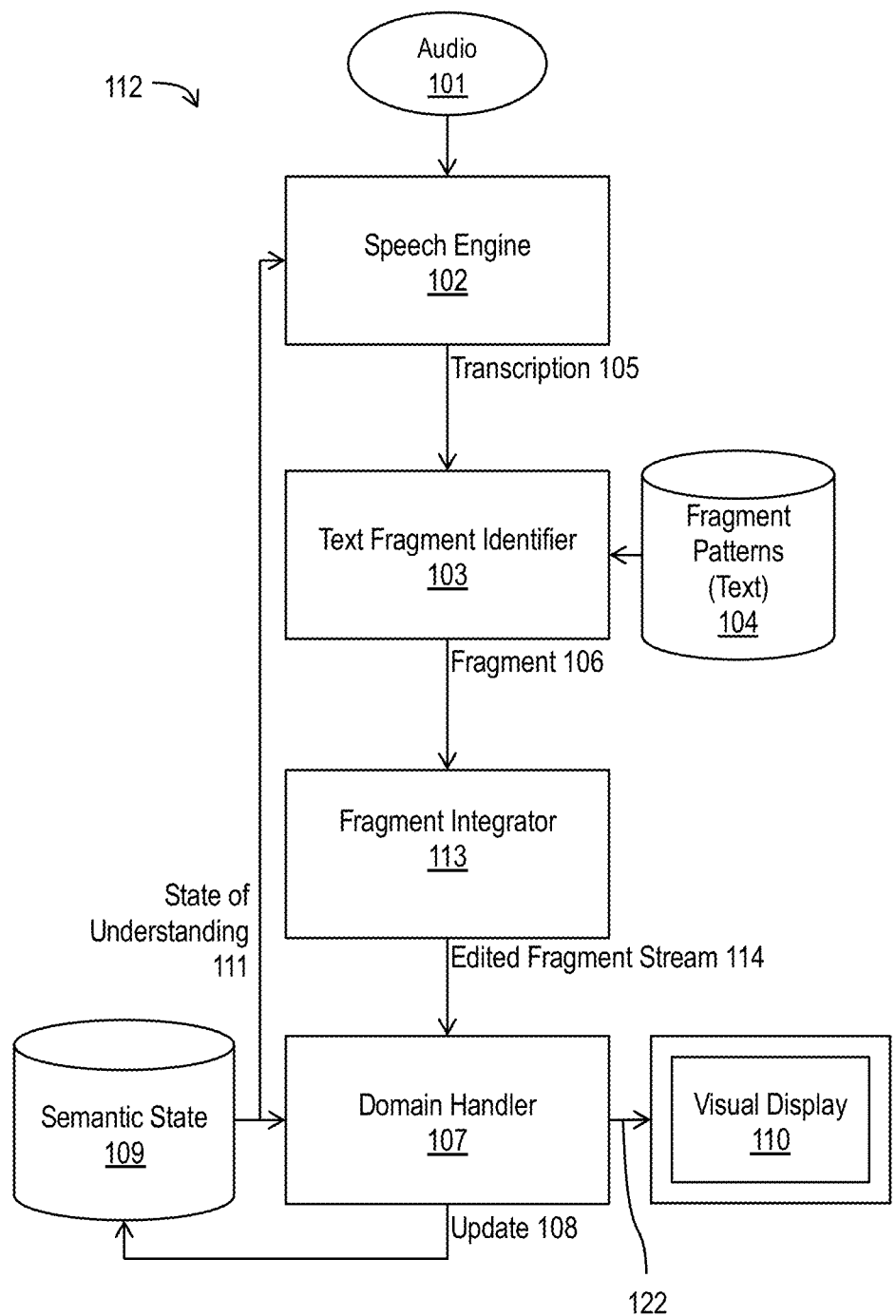
FIG. 1A is a high-level block diagram illustrating an embodiment of the system in FIG. 1 having a fragment integrator.

FIG. 1A is a block diagram illustrating an embodiment of FIG. 1 having system 112 with fragment integrator 113. Fragment integrator 113 stores fragment 106 for a delay period before edited fragment stream 114 is processed by domain handler 107.

Figure 1B:
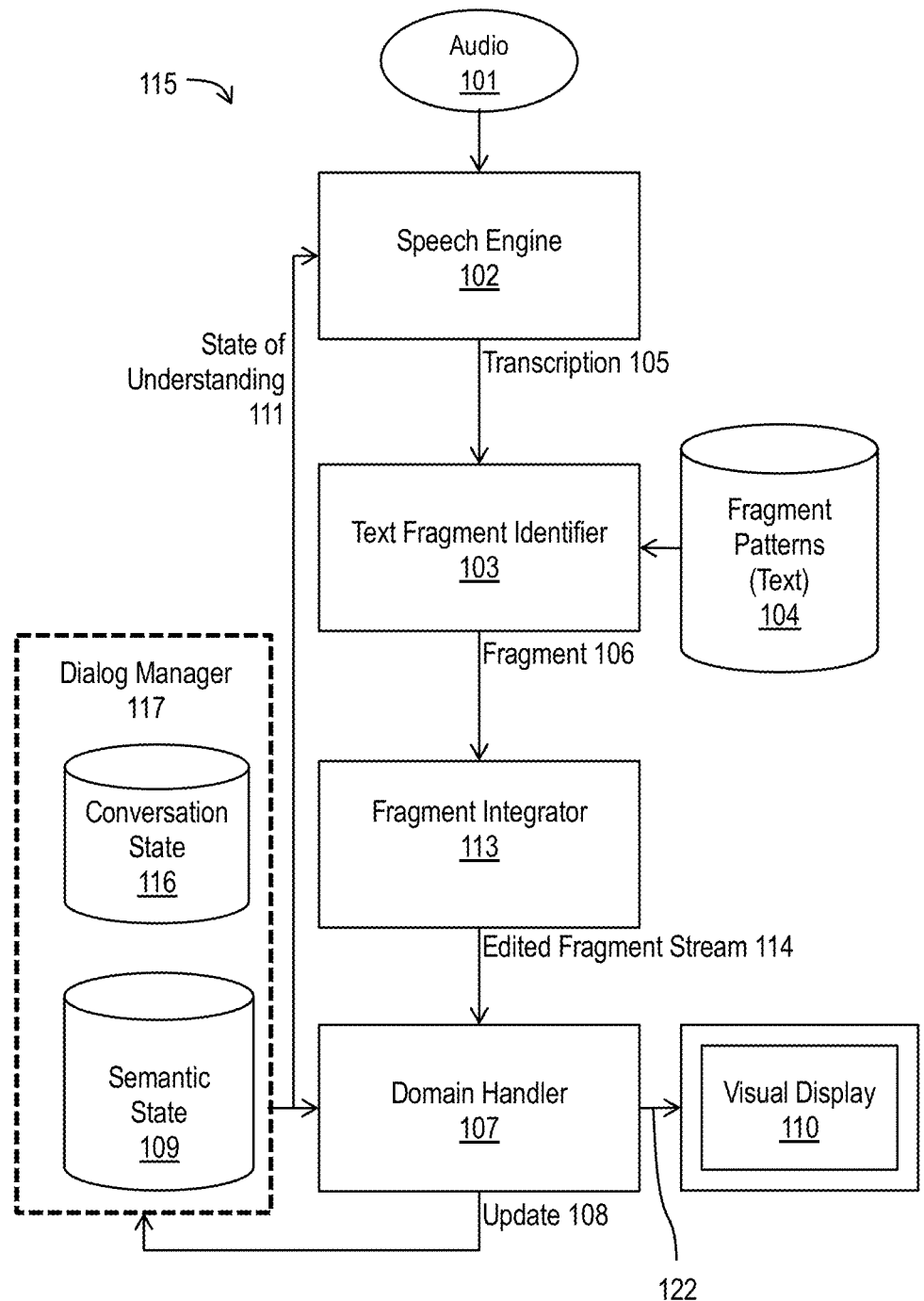
FIG. 1B is an illustration of a diagram of an embodiment of the system in FIG. 1A in which a domain handler causes a dialog manager to update the semantic state and a conversation state.

FIG. 1B is a block diagram illustrating an embodiment of FIG. 1A having system 115. Domain handler 107 causes dialog manager 117 to update semantic state 109 and conversation state 116.

Figure 1C:
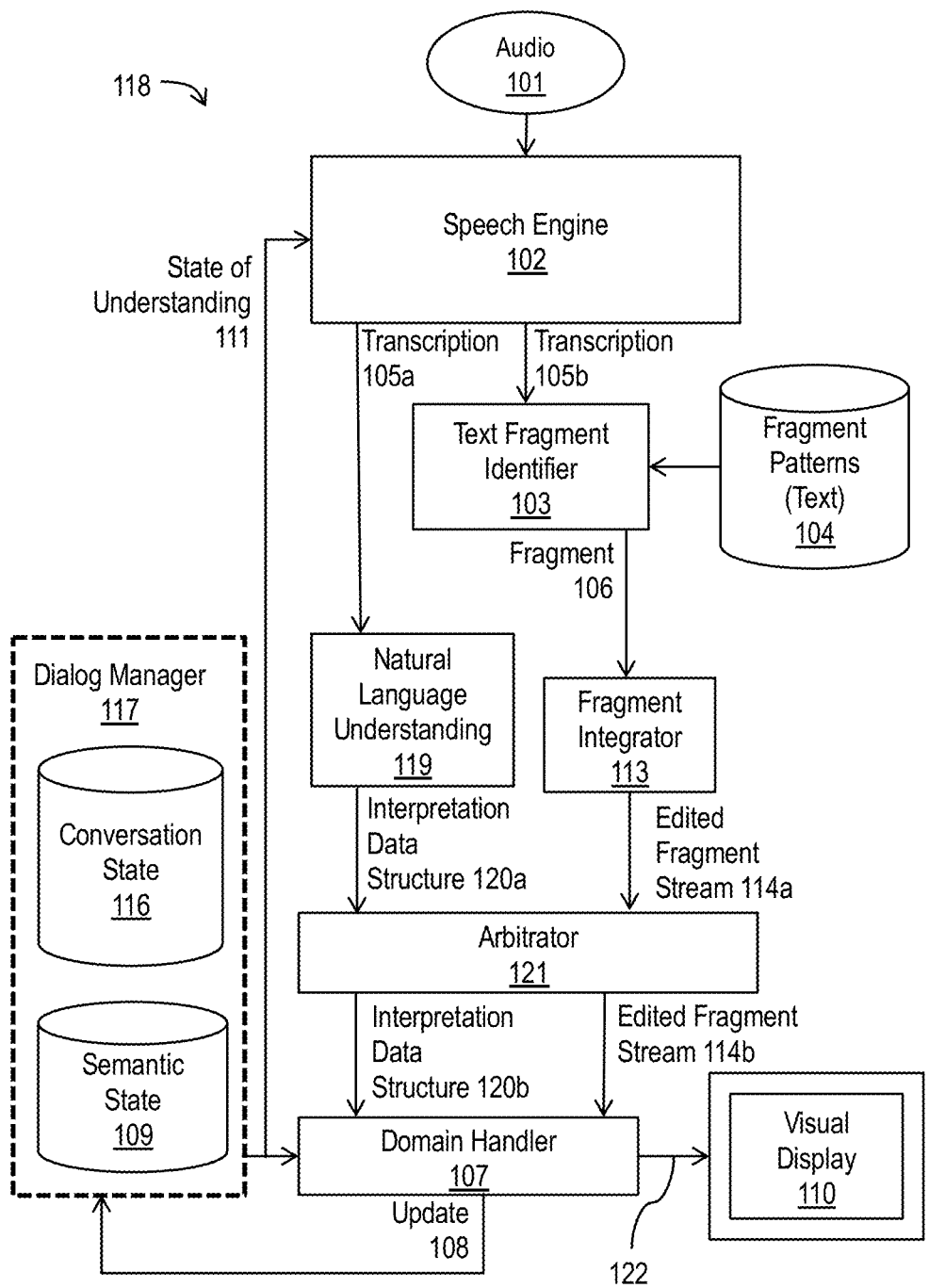
FIG. 1C is an illustration of a diagram of an embodiment of the system in FIG. 1B in Which an arbitrator selects among a natural language understanding output or a fragment integrator output.

FIG. 1C is a block diagram illustrating an embodiment of FIG. 1B having system 118. Speech engine 102 produces a continuous transcription 105a which is input to natural language understanding 119. Speech engine 102 produces a continuous transcription 105h which is input to text fragment identifier 103. Natural language understanding 119 outputs interpretation data structure 120a. Fragment integrator 113 outputs edited fragment stream 114a. Arbitrator 121 selects among interpretation data structure 120a from natural language understanding 119 or edited fragment stream 114a from fragment integrator 113. Arbitrator 121 selects or filters either interpretation data structure 120*b* or edited fragment stream 114*b* to output through domain handler 107.

Figure 1D:
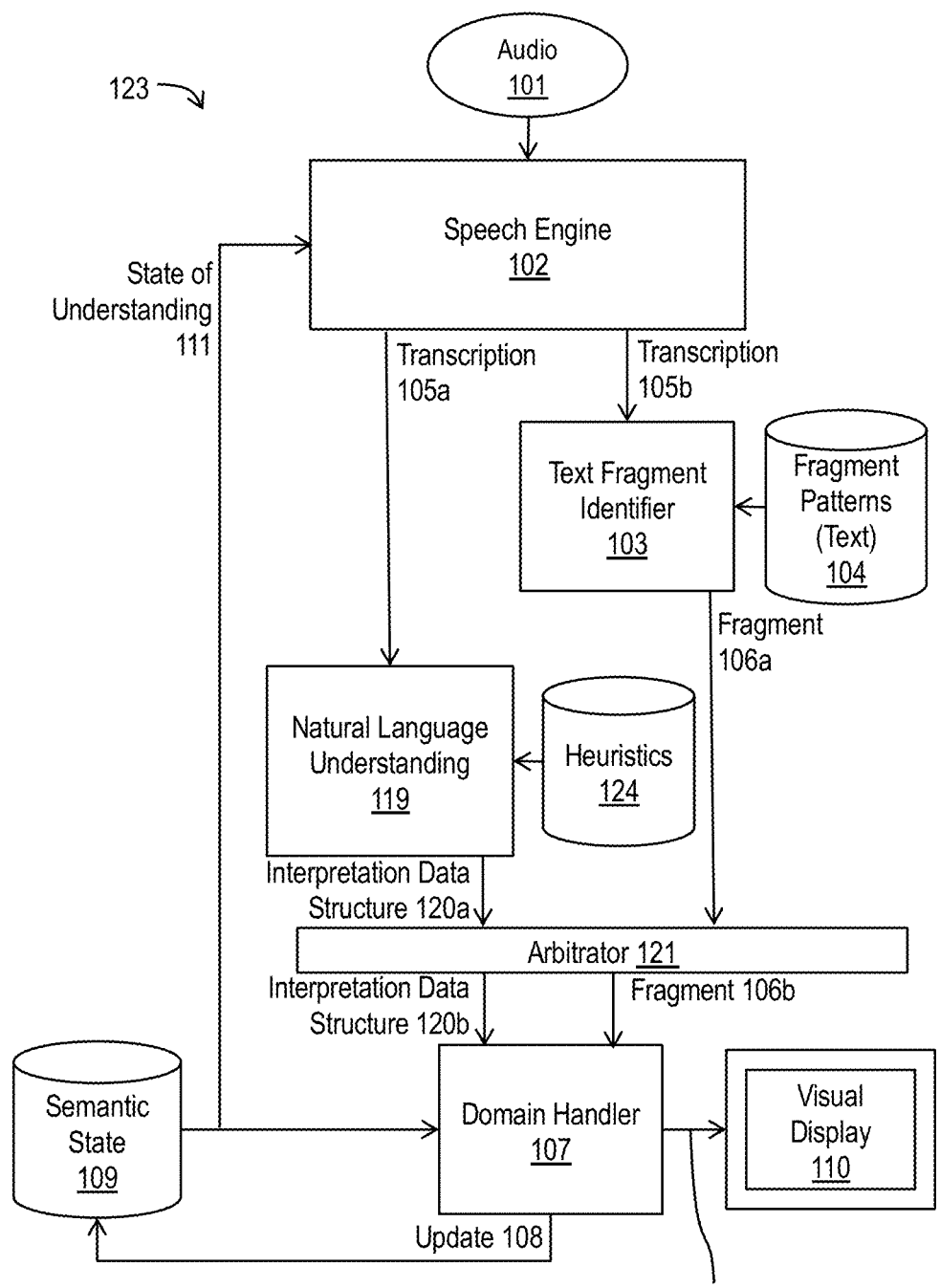
FIG. 1D is an illustration of a diagram of an embodiment of the system in FIG. 1B in which an arbitrator selects among a natural language understanding output or a fragment output from the fragment integrator.

FIG. 1D is a block diagram illustrating an embodiment of FIG. 1B having system 123. Arbitrator 121 selects among interpretation data structure 120*a* from natural language understanding 119 or a fragment 106*a* output from text fragment identifier 103. Heuristics 124 may be used to determine the word sequence in which to apply natural language understanding 119. Arbitrator 121 outputs interpretation data structure 120*a* and fragment 106*b*.

Figure 2:
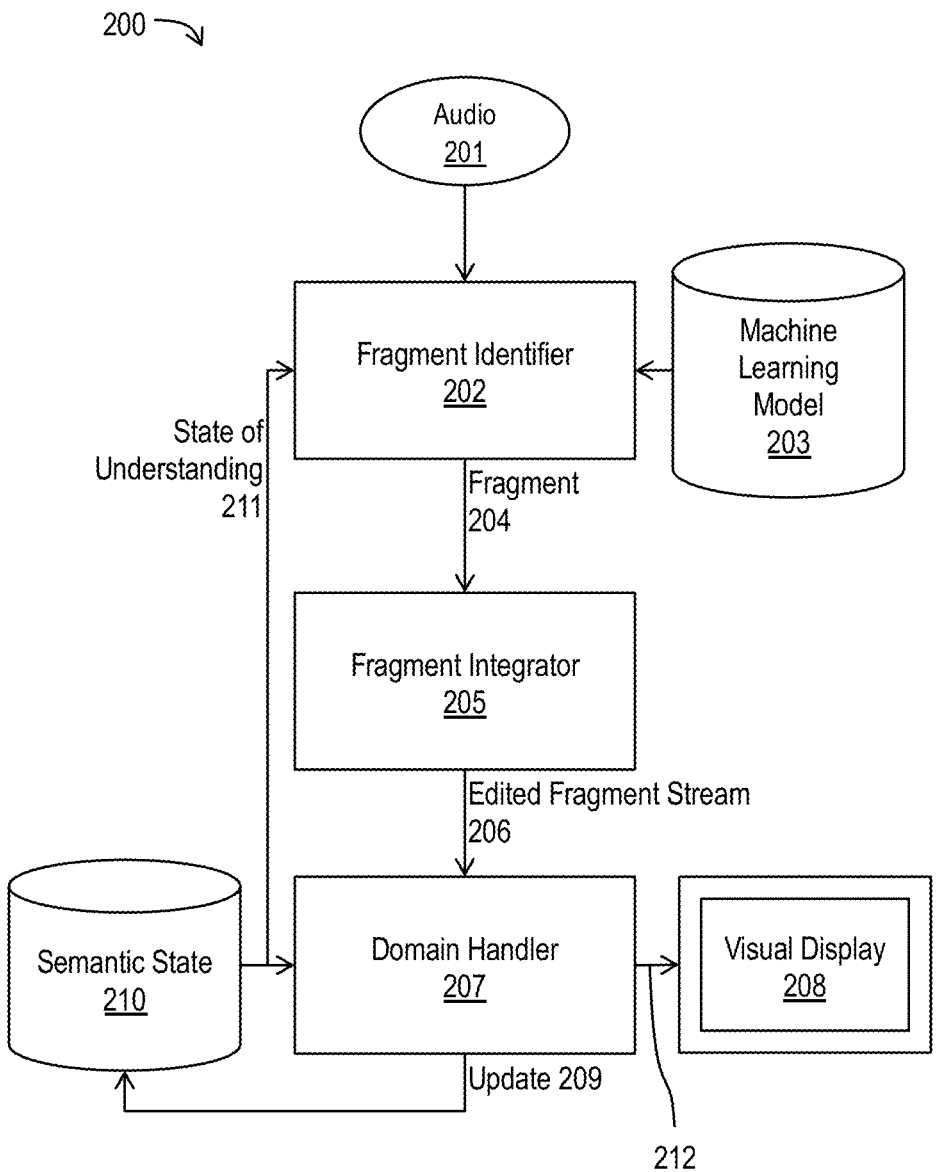
FIG. 2 is an illustration of a diagram of an embodiment of an end-to-end audio recognition implemented using a machine learned fragment identifier model.

FIG. 2 is an illustration of a diagram of an embodiment of an end-to-end audio recognition system 200 implemented as a machine learning model. Speech audio 201 being input into fragment identifier 202. Fragment identifier 202 executes a machine learned model on speech audio 201. Fragment identifier 202, using the machine learned model, infers the presence of fragment 204 in speech audio 201. The machine learned model is trained on samples of speech audio labeled as corresponding to a specific fragment. Supervised learning with solicited, curated, or hand labeled audio data is one possible approach to training. Unsupervised, semi-supervised, or reinforcement learned model training can also work to create a fragment identifier model that infers the presence of key fragments directly from speech audio.

Fragment identifier 202 outputs fragment 204 obtained from its inference by machine learning model 203. System 200 uses a machine learning model 203 such as a neural network to convert audio 201 to a fragment without an intermediate step of calculating a transcription. Fragment integrator 205 stores fragment 204 for a delay period before edited fragment stream 206 is processed by domain handler 207. Fragments 204 are processed immediately as they are identified by domain handler 207. Domain handler 207 continuously updates 209 semantic state 210. The accumulated state of understanding 211 of the utterance is an output of the updated semantic state 210. In an embodiment, domain handler 207 can cause 212 visual display 208 to update when domain handler 207 processes fragment stream 206 in real time. Semantic state 210 change can cause a display update, such as visual display 208.

Figure 3:
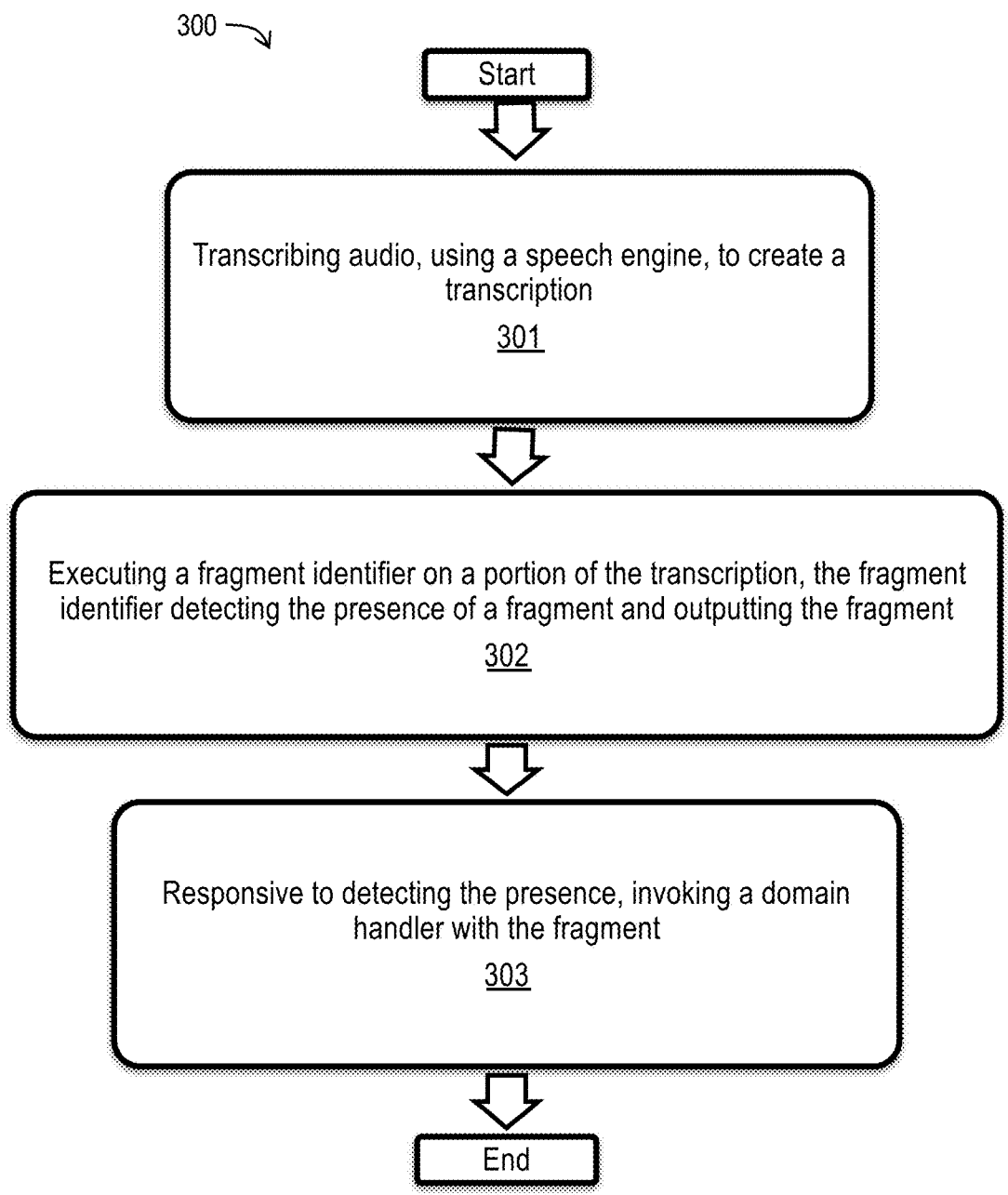
FIG. 3 is a flow chart illustrating a method for processing a fragment in a natural language understanding environment.

FIG. 3 is a flow chart illustrating method 300 for processing a fragment in a natural language understanding environment. The method 300 may comprise a step 301 of transcribing audio, using a speech engine, to create a transcription.

The method 300 may also include the step 302 of executing a fragment identifier on a portion of the transcription. The fragment identifier inferring the presence of a fragment in the portion of speech audio and outputting the fragment obtained from its mapping of fragments to the fragment The method 300 may further include a step 303 of, responsive to detecting the presence, invoking a domain handler with the fragment.

Figure 3A:
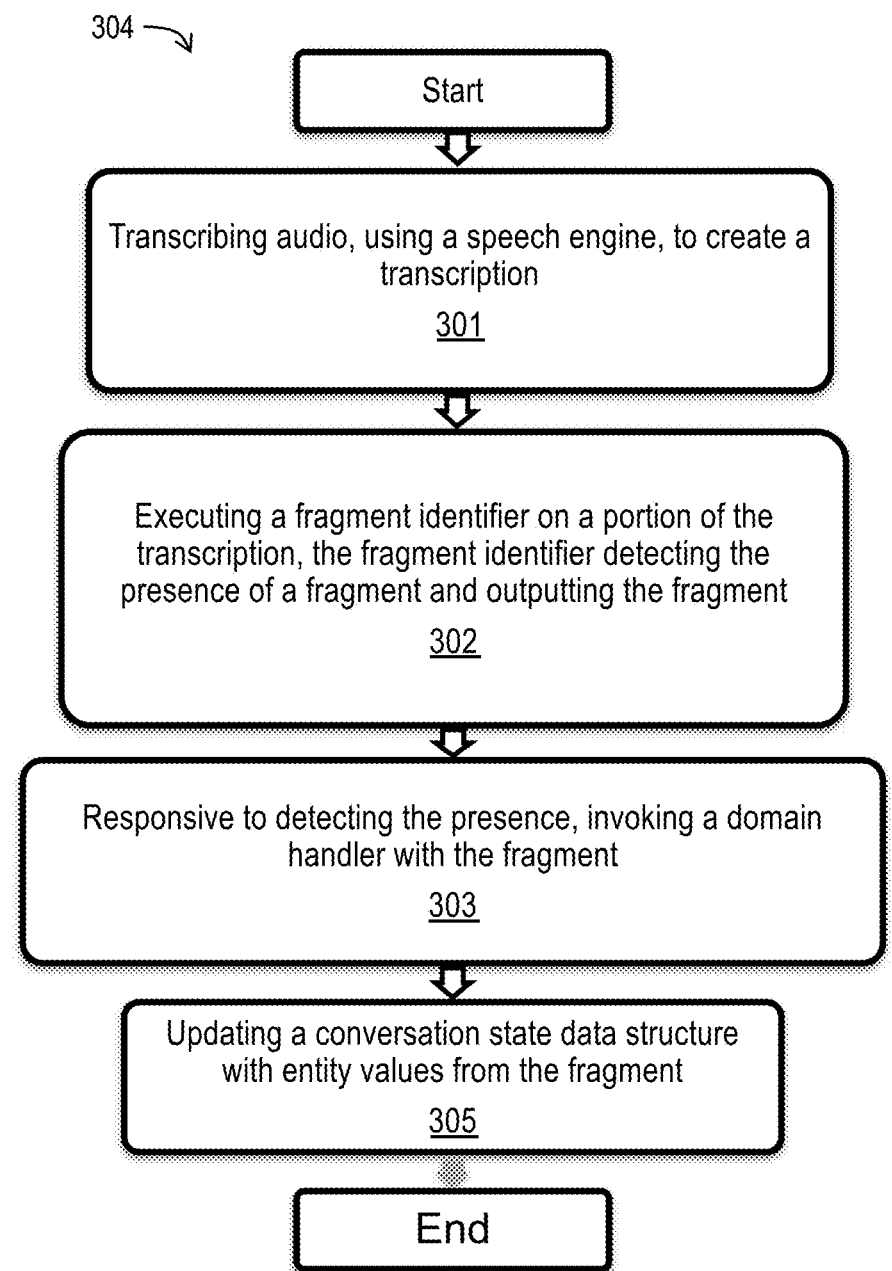
FIG. 3A is a flow chart illustrating an alternate method for processing a fragment in a natural language understanding environment.

FIG. 3A is a flow chart illustrating an alternate method 304 for processing a fragment in a natural language understanding environment. The method 304 may include the steps of FIG. 3 and a step 305 of updating a conversation state data structure with entity values from the fragment.

Figure 3B:
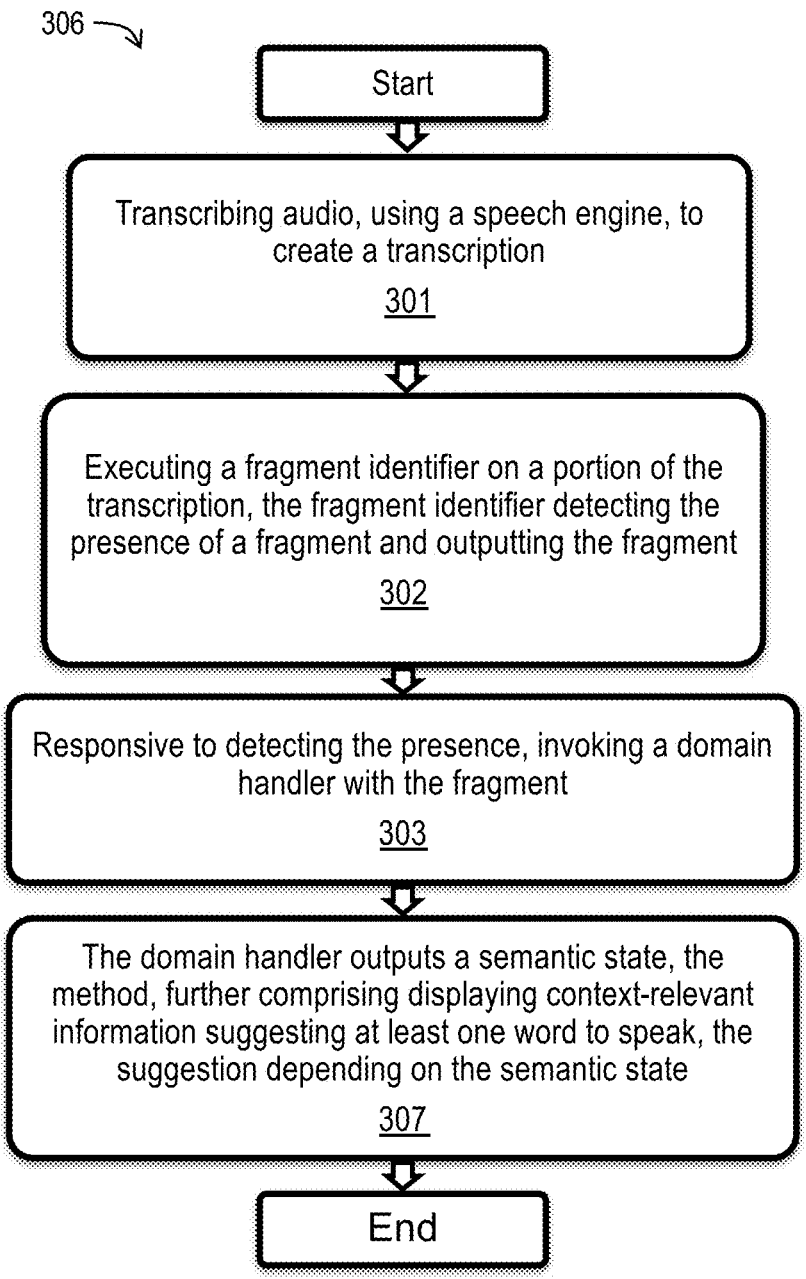
FIG. 3B is a flow chart illustrating an alternate method for processing a fragment in a natural language understanding environment.

FIG. 3B is a flow chart illustrating an alternate method 306 for processing a fragment in a natural language understanding environment. The method 306 may include the steps of FIG. 3 and a step 307 of the domain handler outputs a semantic state, the method, further comprising displaying context-relevant information suggesting at least one word to speak, the suggestion depending on the semantic state.

Figure 3C:
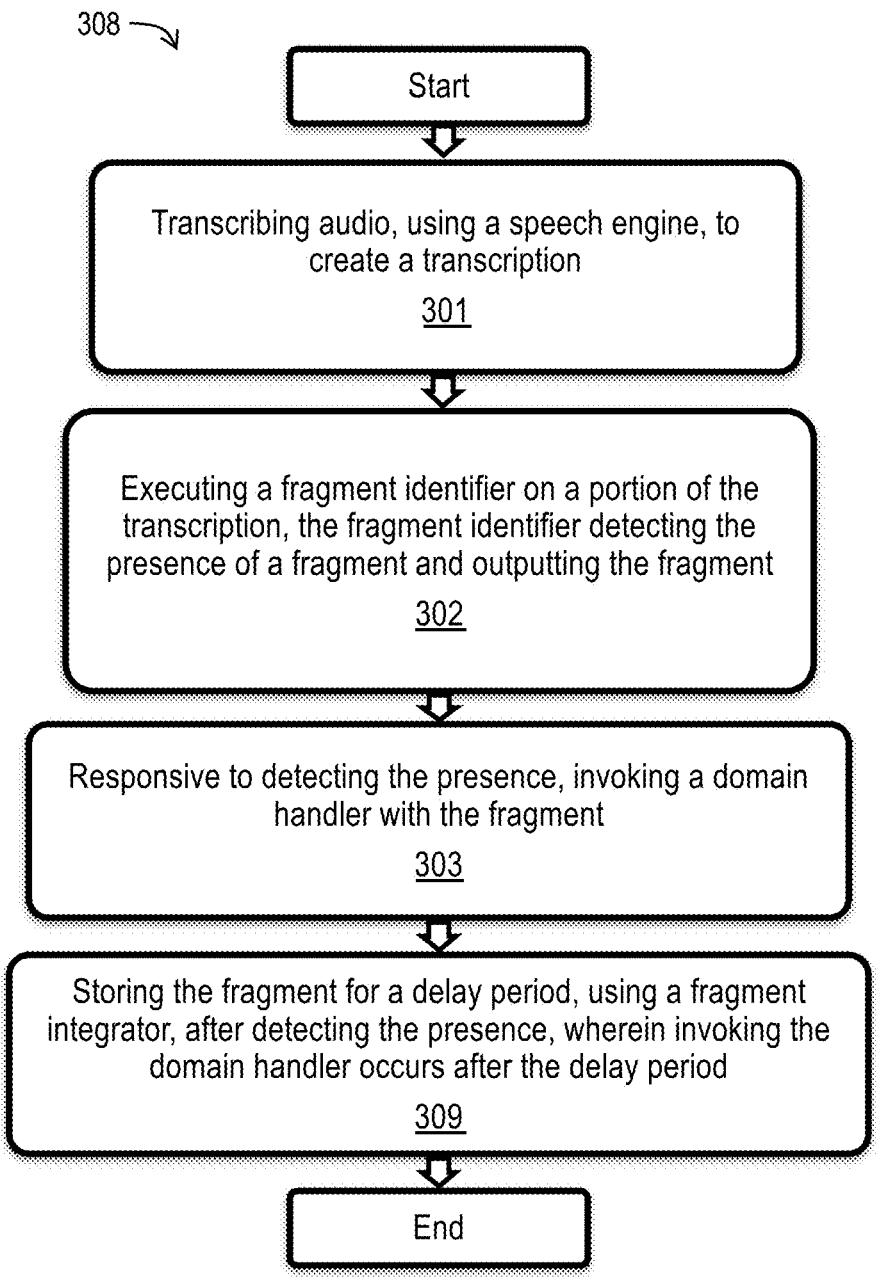
FIG. 3C is a flow chart illustrating an alternate method for processing a fragment in a natural language understanding environment.

FIG. 3C is a flow chart illustrating an alternate method 308 for processing a fragment in a natural language understanding environment. The method 308 may include the steps of FIG. 3 and a step 309 of storing the fragment for a delay period, using a fragment integrator, after detecting the presence, wherein invoking the domain handler occurs after the delay period.

Figure 3D:
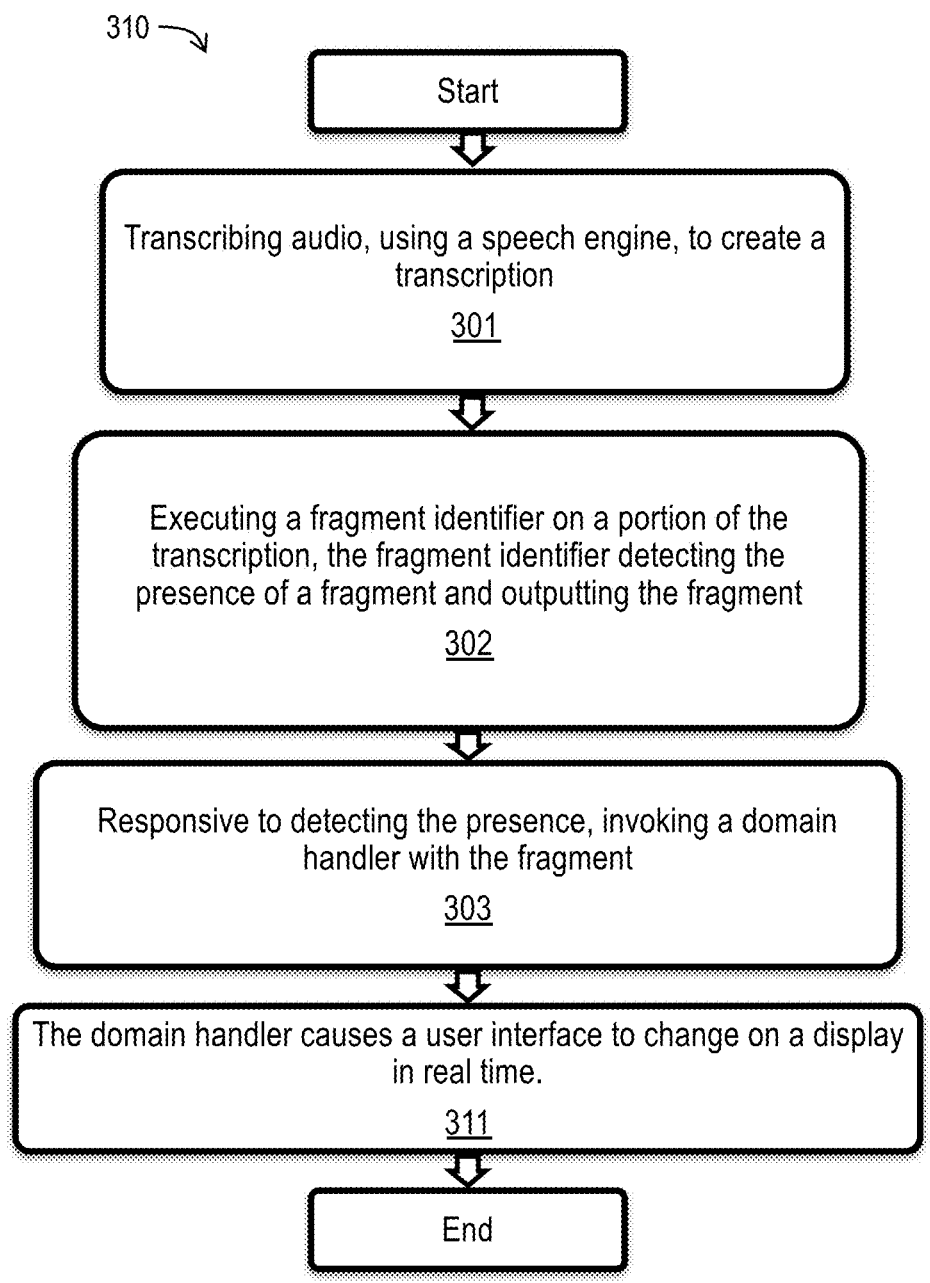
FIG. 3D is a flow chart illustrating an alternate method for processing a fragment in a natural language understanding environment.

FIG. 3D is a flow chart illustrating an alternate method 310 for processing a fragment in a natural language understanding environment. The method 310 may include the steps of FIG. 3 and a step 311 of the domain handler causing a user interface to change on a display in real time.

Figure 3E:
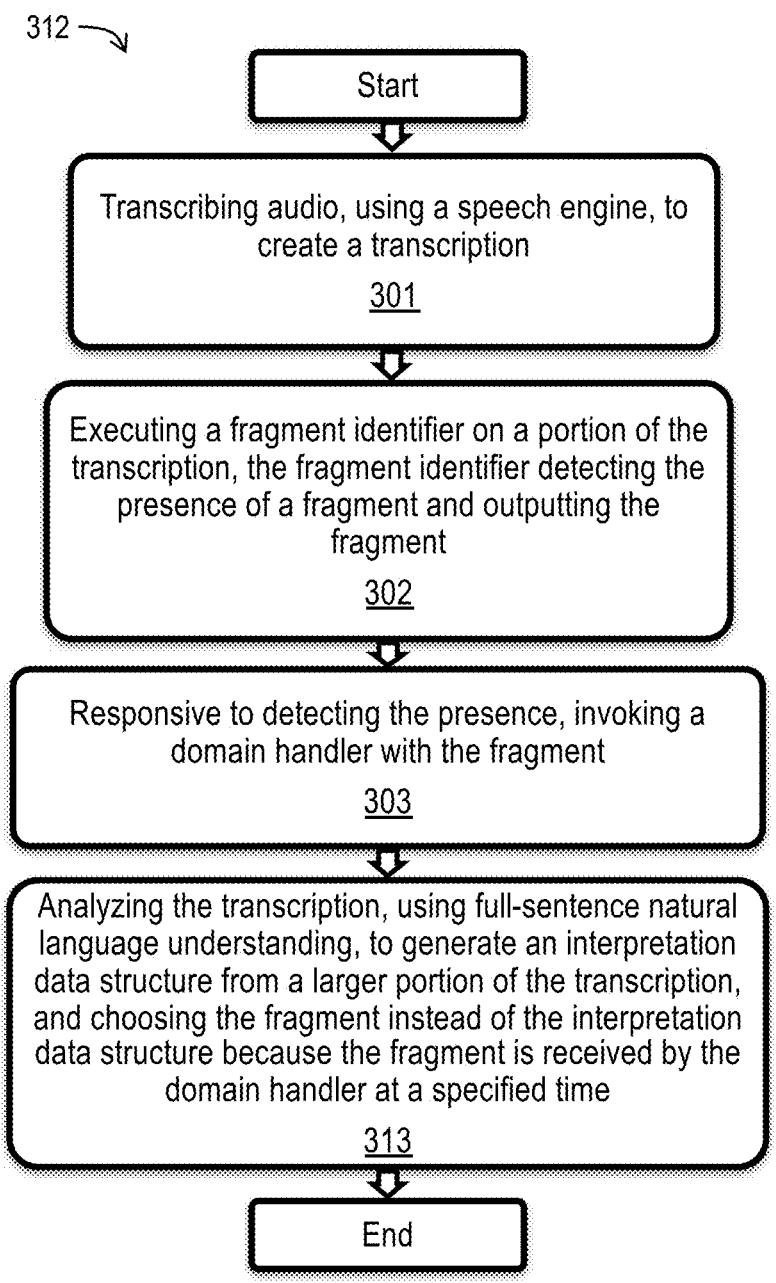
FIG. 3E is a flow chart illustrating an alternate method for processing a fragment in a natural language understanding environment.

FIG. 3E is a flow chart illustrating an alternate method 312 for processing a fragment in a natural language understanding environment. The method 312 may include the steps of FIG. 3 and a step 313 of analyzing the transcription, using full-sentence natural language understanding to generate an interpretation data structure from a larger portion of the transcription, and choosing the fragment instead of the interpretation data structure because the fragment is received by the domain handler at a specified time.

Figure 3F:
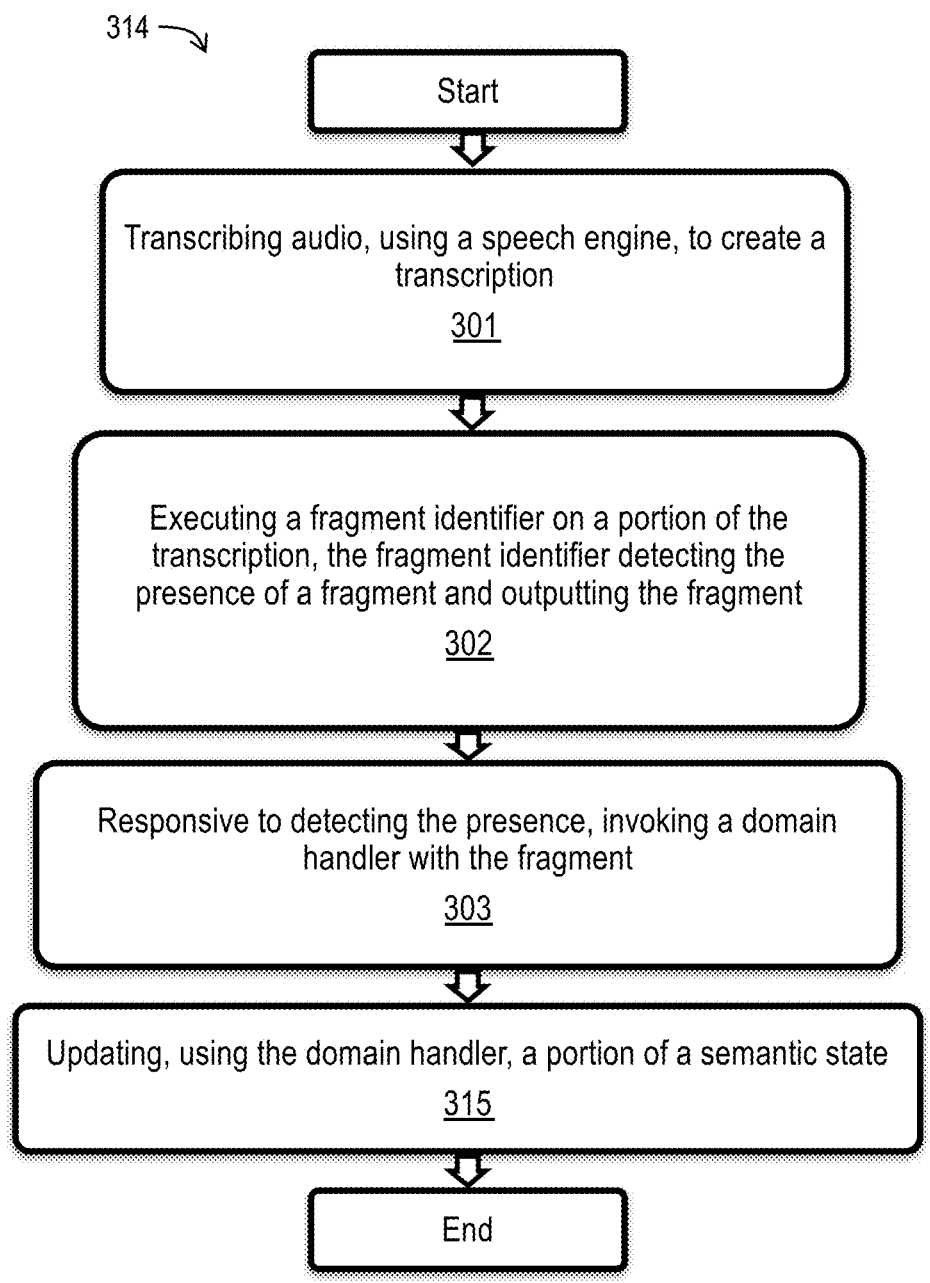
FIG. 3F is a flow chart illustrating an alternate method for processing a fragment in a natural language understanding environment.

FIG. 3F is a flow chart illustrating an alternate method 314 for processing a fragment in a natural language understanding environment. The method 314 may include the steps of FIG. 3 and a step 315 of updating, using the domain handler, a portion of a semantic state.

Figure 3G:
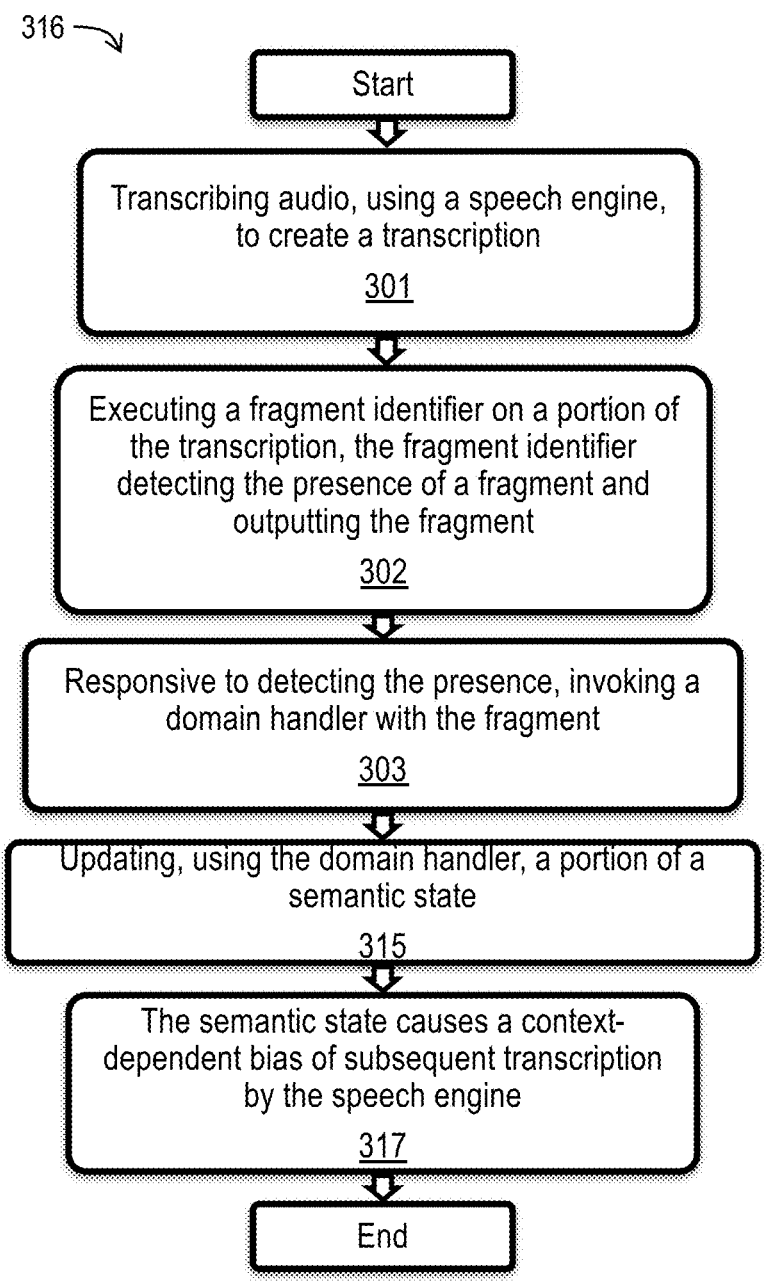
FIG. 3G is a flow chart illustrating an alternate method for processing a fragment in a natural language understanding environment.

FIG. 3G is a flow chart illustrating an alternate method 316 for processing a fragment in a natural language understanding environment. The method 316 may include the steps of FIG. 3 and a step 315 of updating, using the domain handler, a portion of a semantic state.

The method 316 may also include the step 317 of the semantic state causing a context-dependent bias of subsequent transcription by the speech engine.

Figure 4:
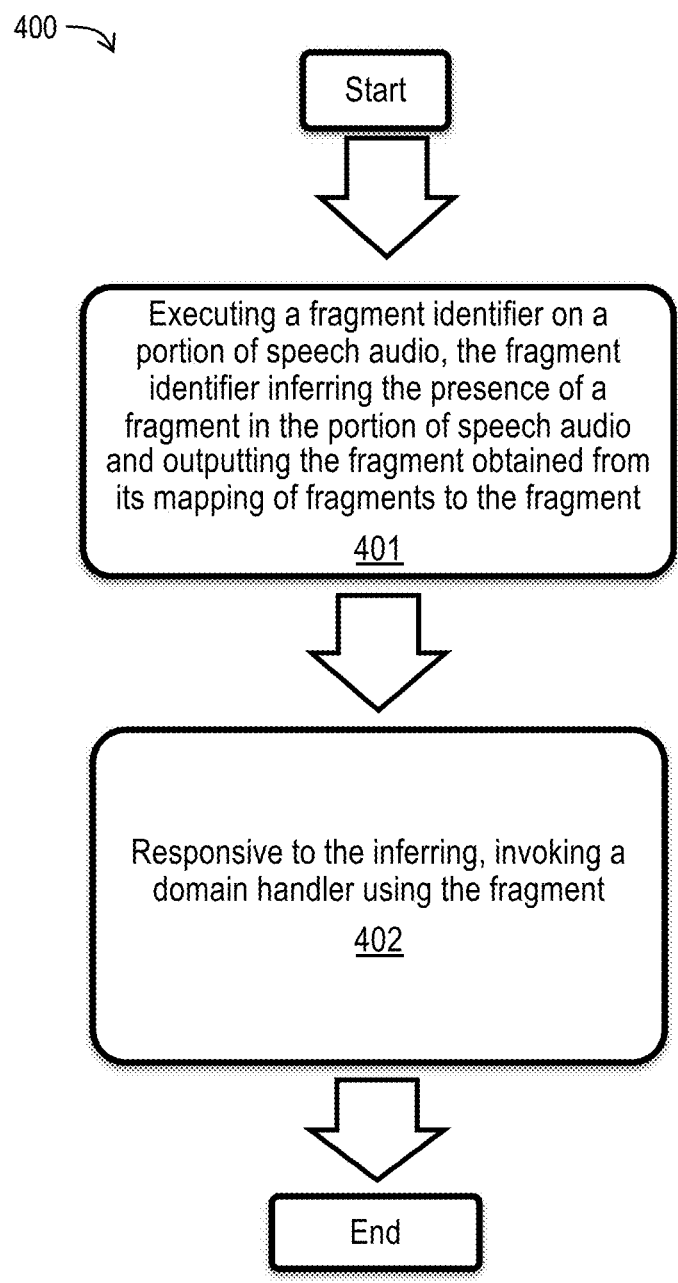
FIG. 4 is a flow chart illustrating a method for processing a fragment using a fragment identifier implemented using a sequence-to-sequence neural network.

FIG. 4 is a flow chart illustrating a method 400 for processing a fragment in a sequence-to-sequence neural network. The method 400 may comprise a step 401 of executing a fragment identifier on a portion of speech audio, the fragment identifier inferring the presence of a fragment in the portion of speech audio and outputting the fragment obtained from its mapping of fragments to the fragment.

The method 400 may also include the step 402 of being responsive to the inferring, invoking a domain handler using the fragment.

Figure 4A:
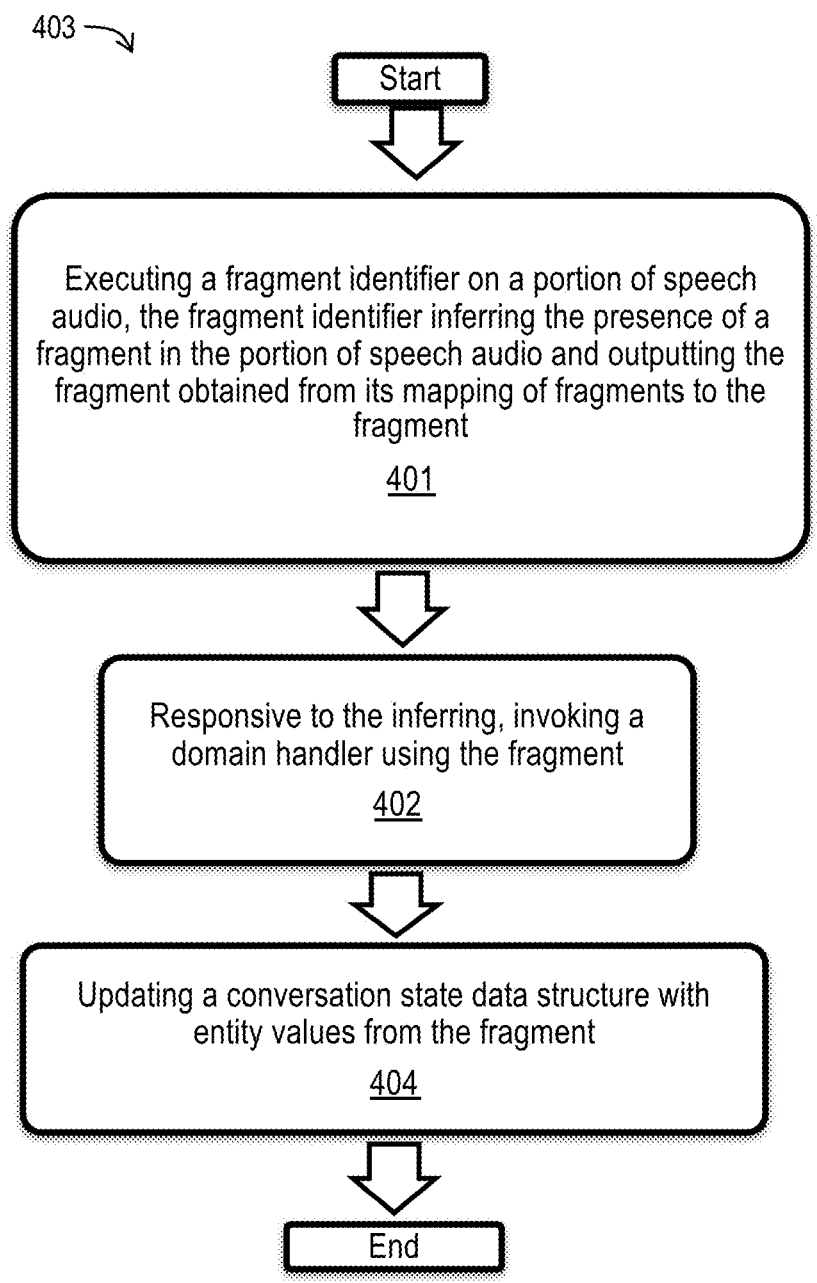
FIG. 4A is a flow chart illustrating an alternate method for processing a fragment using a fragment identifier implemented using a sequence-to-sequence neural network.

FIG. 4A is a flow chart illustrating an alternate method 403 for processing a fragment in a sequence-to-sequence neural network. The method 403 may include the steps of FIG. 4 and a step 404 of updating a conversation state data structure with entity values from the fragment.

Figure 4B:
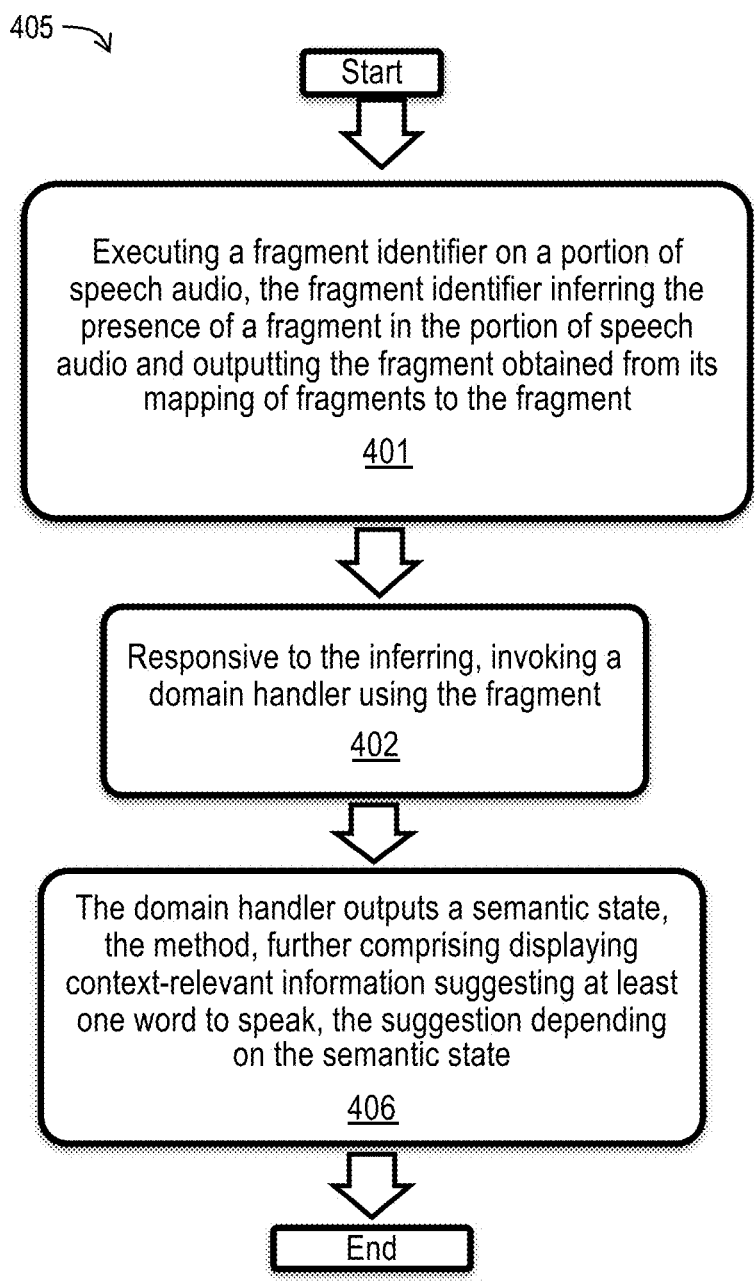
FIG. 4B is a flow chart illustrating an alternate method for processing a fragment using a fragment identifier implemented using a sequence-to-sequence neural network.

FIG. 4B is a flow chart illustrating an alternate method 405 for processing a fragment in a sequence-to-sequence neural network. The method 403 may include the steps of FIG. 4 and a step 406 of the domain handler outputting a semantic state, the method, further comprising displaying context-relevant information suggesting at least one word to speak, the suggestion depending on the semantic state.

Figure 4C:
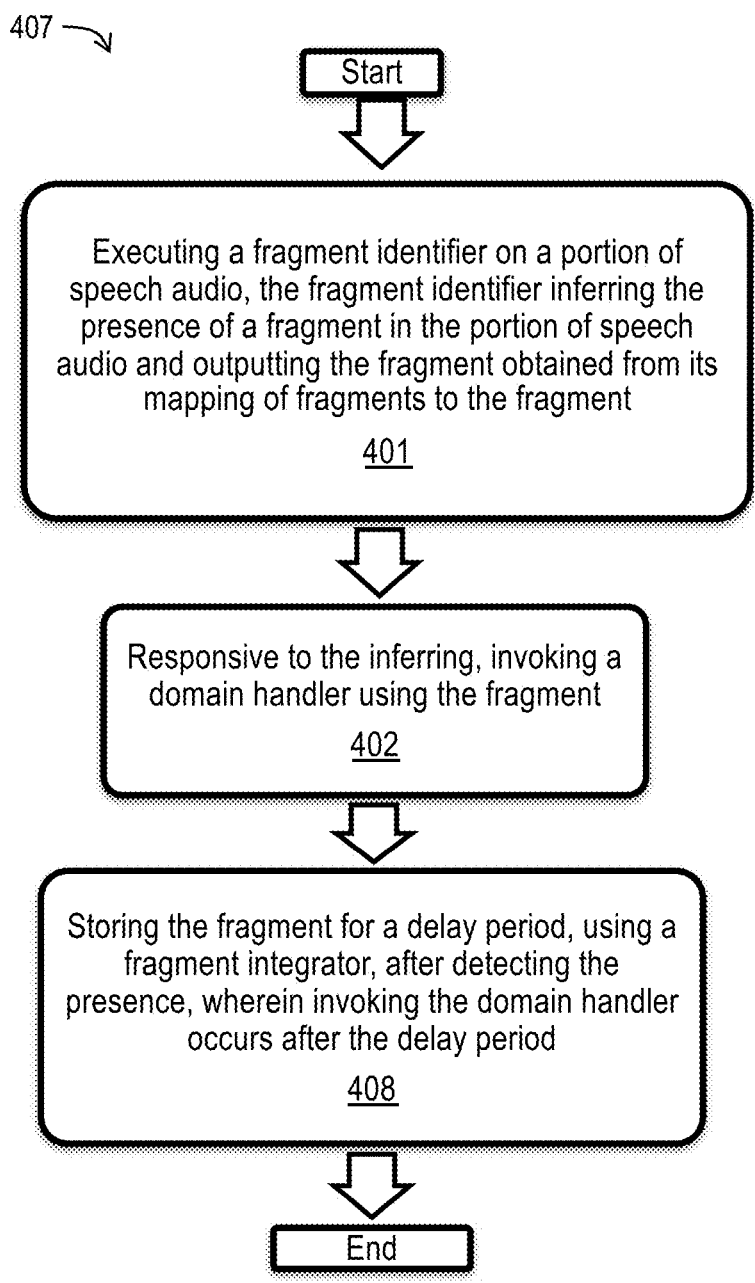
FIG. 4C is a flow chart illustrating an alternate method for processing a fragment using a fragment identifier implemented using a sequence-to-sequence neural network.

FIG. 4C is a flow chart illustrating an alternate method 407 for processing a fragment in a sequence-to-sequence neural network. The method 407 may include the steps of FIG. 4 and a step 408 of storing the fragment for a delay period, using a fragment integrator, after detecting the presence, wherein invoking the domain handler occurs after the delay period.

Figure 4D:
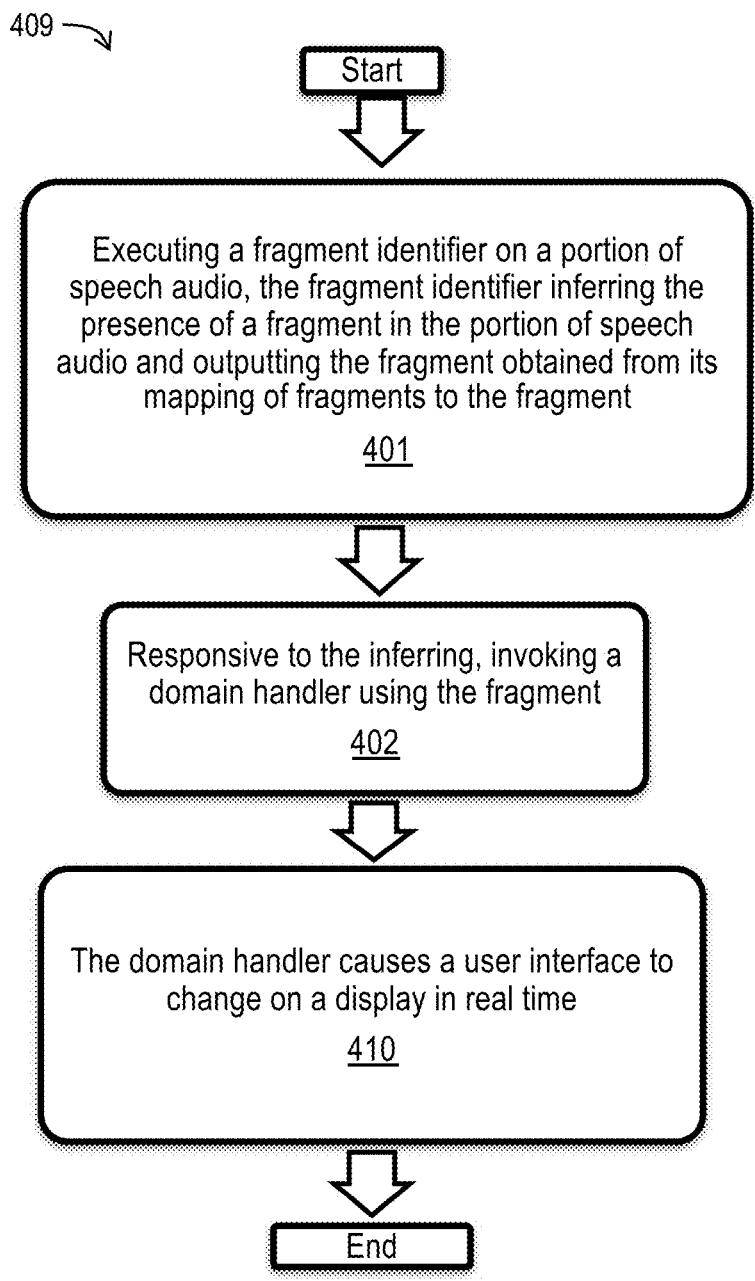
FIG. 4D is a flow chart illustrating an alternate method for processing a fragment using a fragment identifier implemented using a sequence-to-sequence neural network.

FIG. 4D is a flow chart illustrating an alternate method 409 for processing a fragment in a sequence-to-sequence neural network. The method 409 may include the steps of FIG. 4 and a step 410 of the domain handler causing a user interface to change on a display in real time.

Figure 4E:
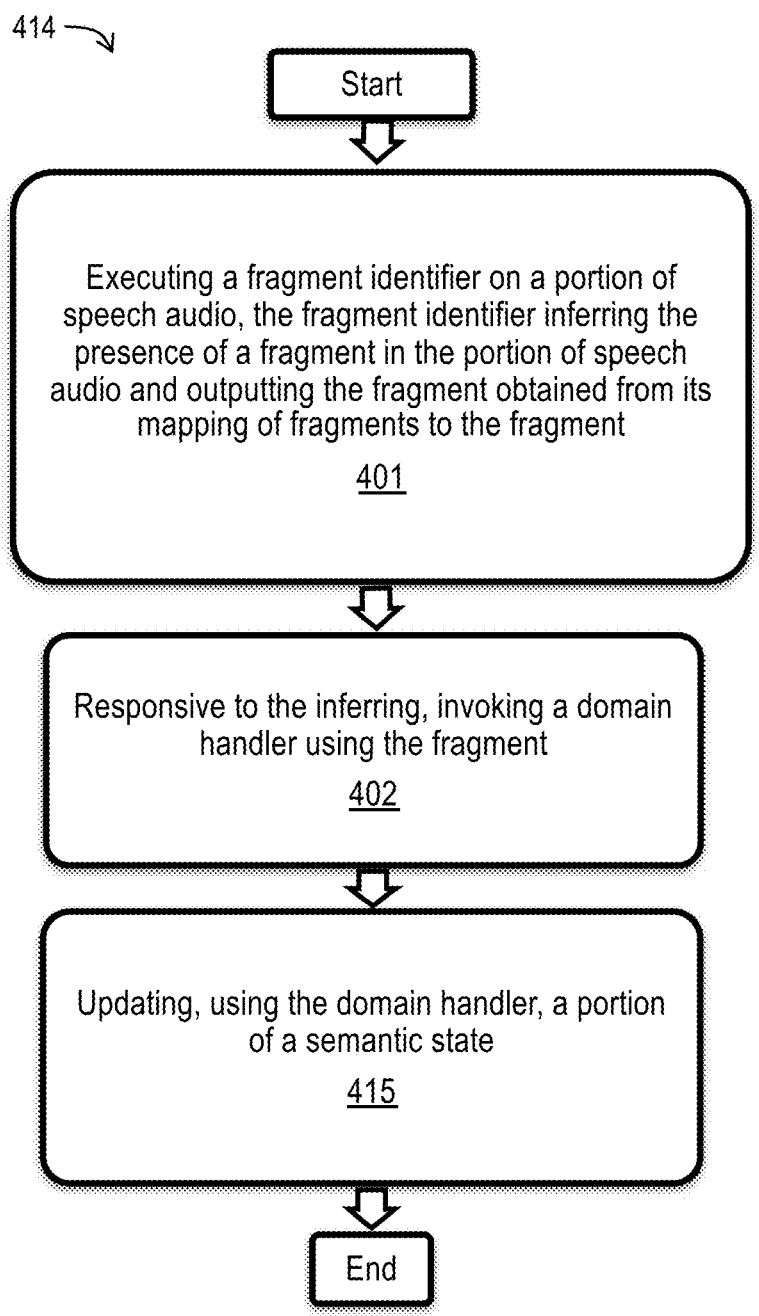
FIG. 4E is a flow chart illustrating an alternate method for processing a fragment using a fragment identifier implemented using a sequence-to-sequence neural network.

FIG. 4E is a flow chart illustrating an alternate method 414 for processing a fragment in a sequence-to-sequence neural network. The method 414 may include the steps of FIG. 4 and a step 415 of updating, using the domain handler, a portion of a semantic state.

Figure 4F:
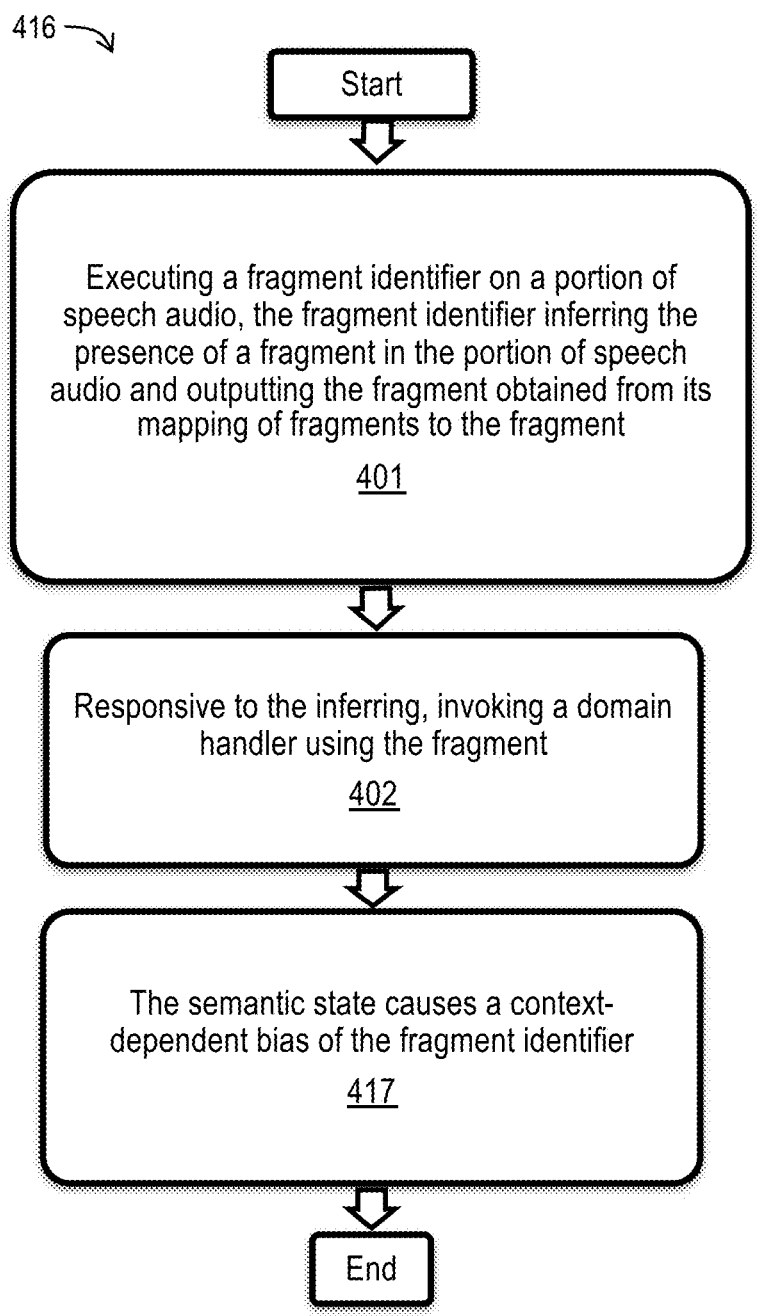
FIG. 4F is a flow chart illustrating an alternate method for processing a fragment using a fragment identifier implemented using a sequence-to-sequence neural network.

FIG. 4F is a flow chart illustrating an alternate method 416 for processing a fragment in a sequence-to-sequence neural network. The method 416 may include the steps of FIG. 4 and a step 417 of the semantic state causes a context-dependent bias of the fragment identifier.

Figure 5:
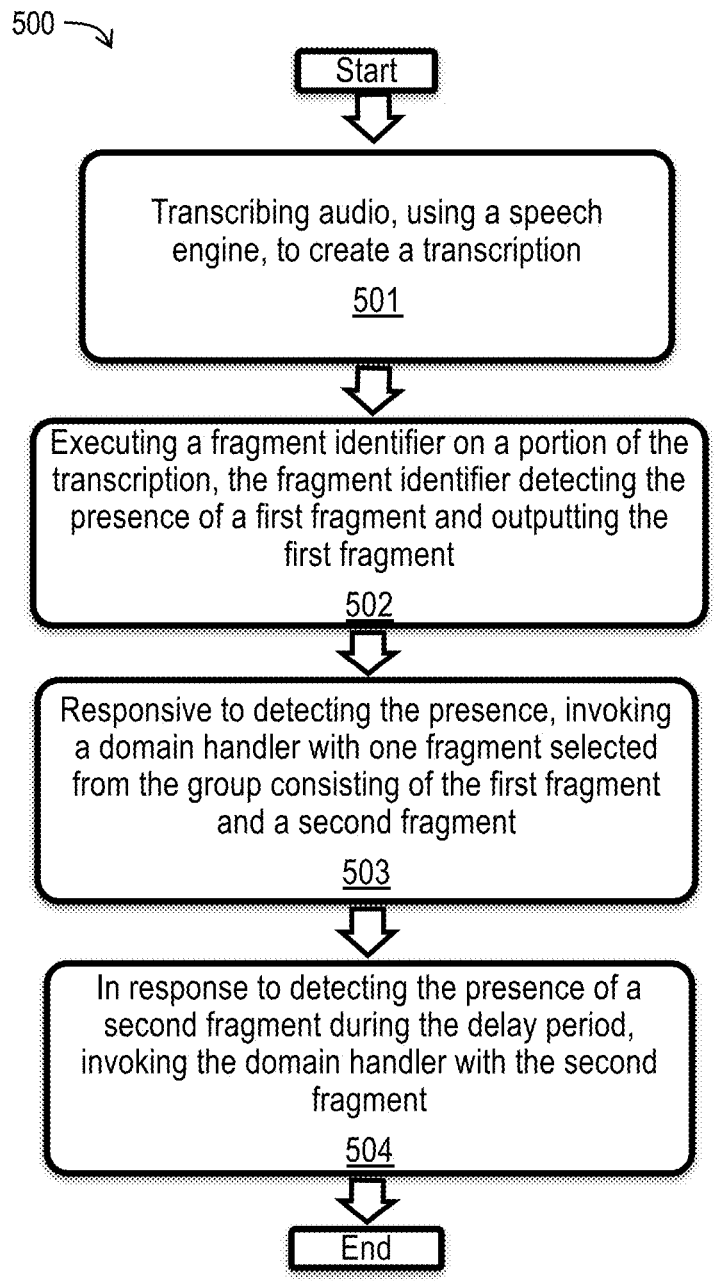
FIG. 5 is flow chart illustrating a method for processing a fragment in a natural language understanding environment.

FIG. 5 is a flow chart illustrating a method 500 for processing a fragment in a sequence-to-sequence neural network. The method 500 may comprise a step 501 of transcribing audio, using a speech engine, to create a transcription.

The method 500 may also include the step 502 of executing a fragment identifier on a portion of the transcription, the fragment identifier detecting the presence of a first fragment and outputting the first fragment.

The method 500 may also include the step 503 of being responsive to detecting the presence, invoking a domain handler with one fragment selected from the group consisting of the first fragment and a second fragment.

The method 500 may also include the step 504 of in response to detecting the presence of a second fragment during the delay period, invoking the domain handler with the second fragment. This step 504 emphasizes the concept of waiting and discarding the first fragment if a better second fragment comes along.

Figure 6:
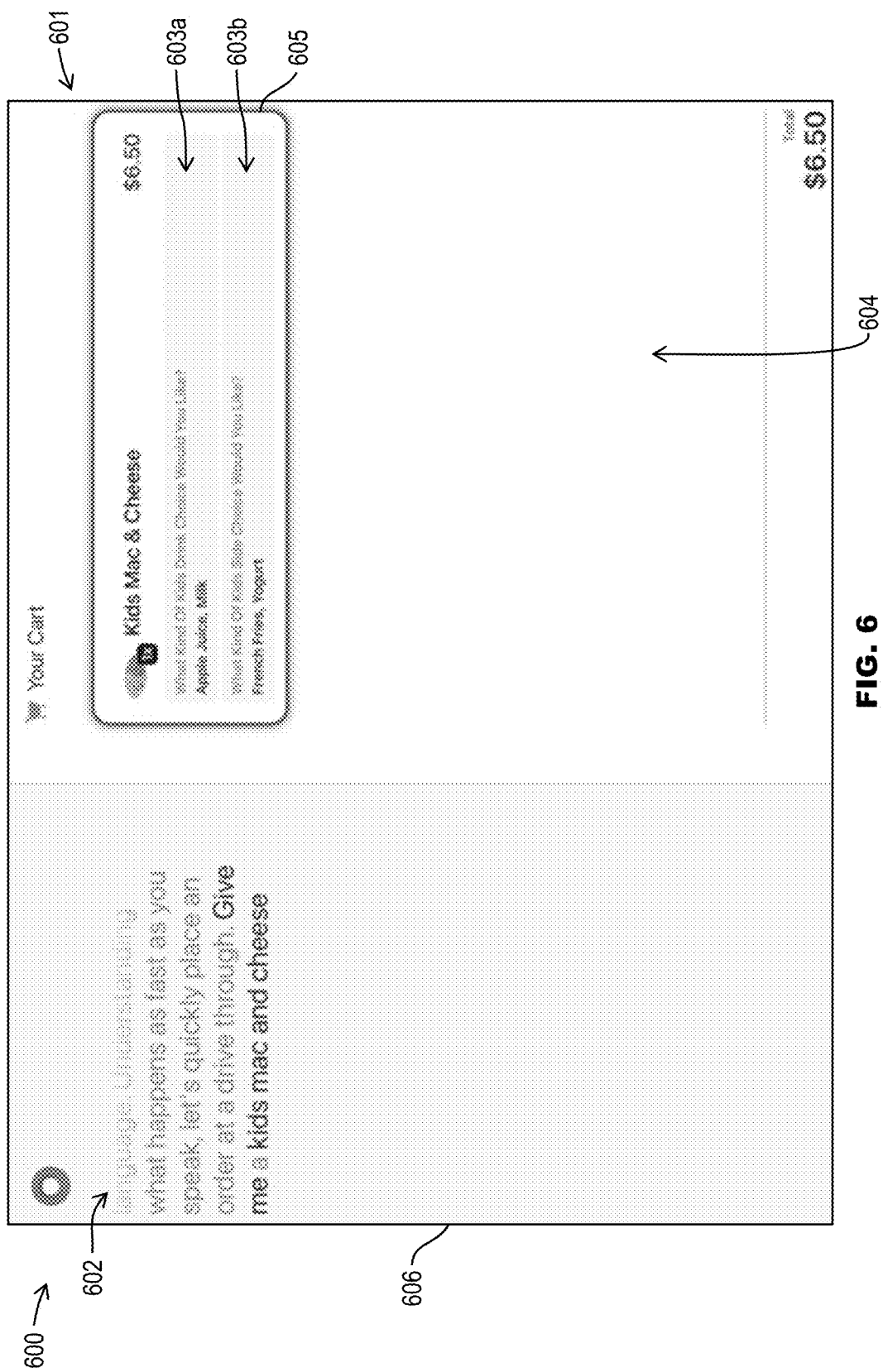
FIG. 6 is an illustration of a device showing an operational sequence that may be performed when running a semantic completion software.

FIG. 6 is an illustration of a display of device 606 showing operational sequence 600 that may be performed when running a fragment processing software. Semantic completion is shown, whereby the semantic state is updated 604 and displayed to a user in real time. Device 606 has user interface 601. Transcription 602 is of a portion of a user's speech in real-time. In an example, order item 605 is Kids Mac & Cheese. Based on transcription 602 requesting a Kids Mac & Cheese without having yet specified an expected drink choice and side choice option, a list of suggestions for drink choice 603*a* and side choice 603*b* is displayed to show possible drink choices 603*a* being apple juice or milk and possible side choice 603*b* being french fries or yogurt.

Figure 6A:
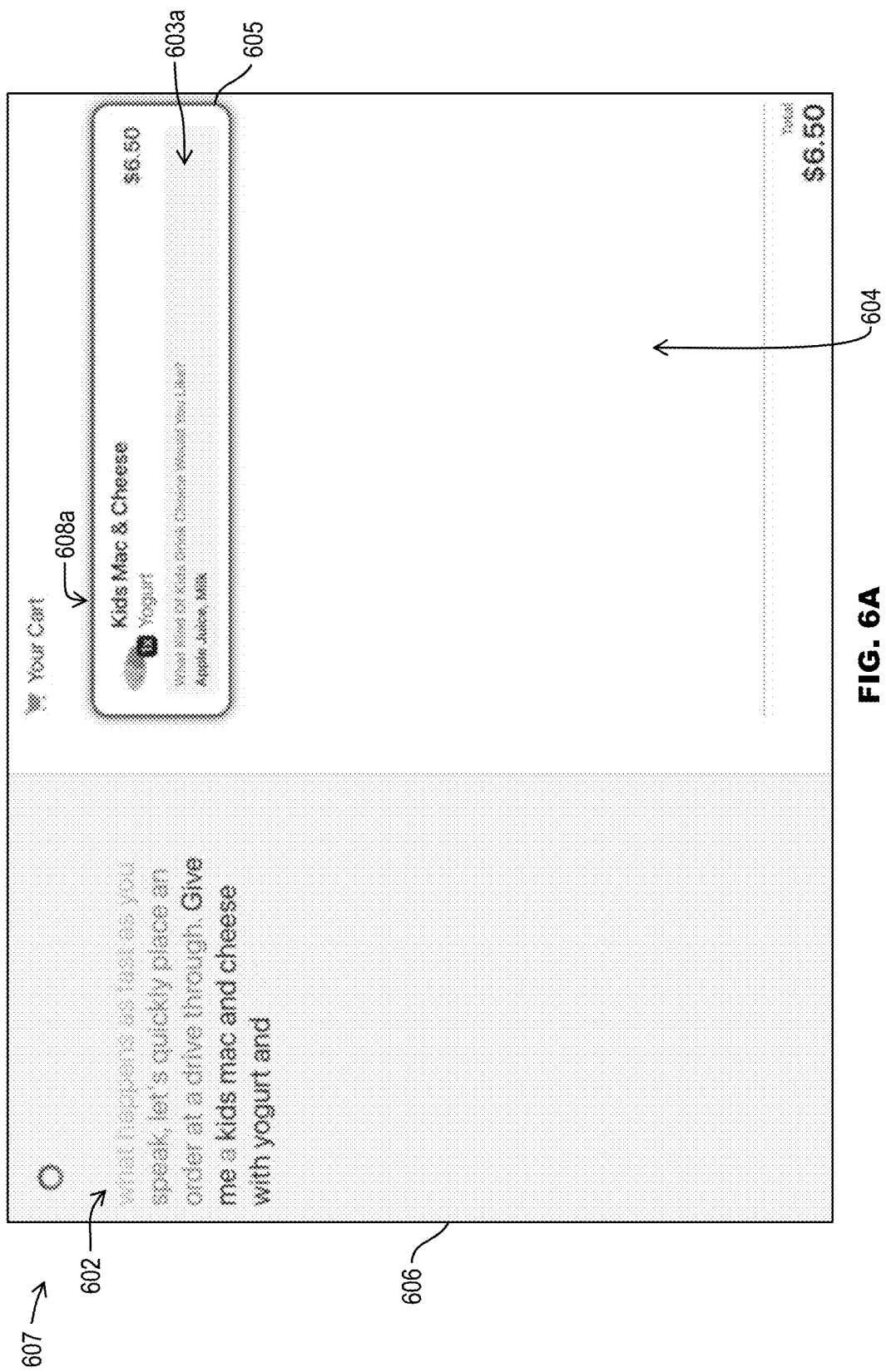
FIG. 6A is an illustration of a device showing an operational sequence that may be performed when running a semantic completion software.

FIG. 6A is an illustration of a display of device 606 showing an operational sequence 607 that may be performed when running a fragment parsing software. Semantic completion is shown, whereby the semantic state is updated 604 and displayed to a user in real time. Device 606 has user interface 601. Transcription 602 is of a portion of a user's speech in real-time. In an example, order item 605 is Kids Mac & Cheese and has the side choice, yogurt, selection 608*a*. Based on transcription 602, a list of suggestions are displayed to show possible drink choices 603*a* being apple juice and/or milk.

Figure 6B:
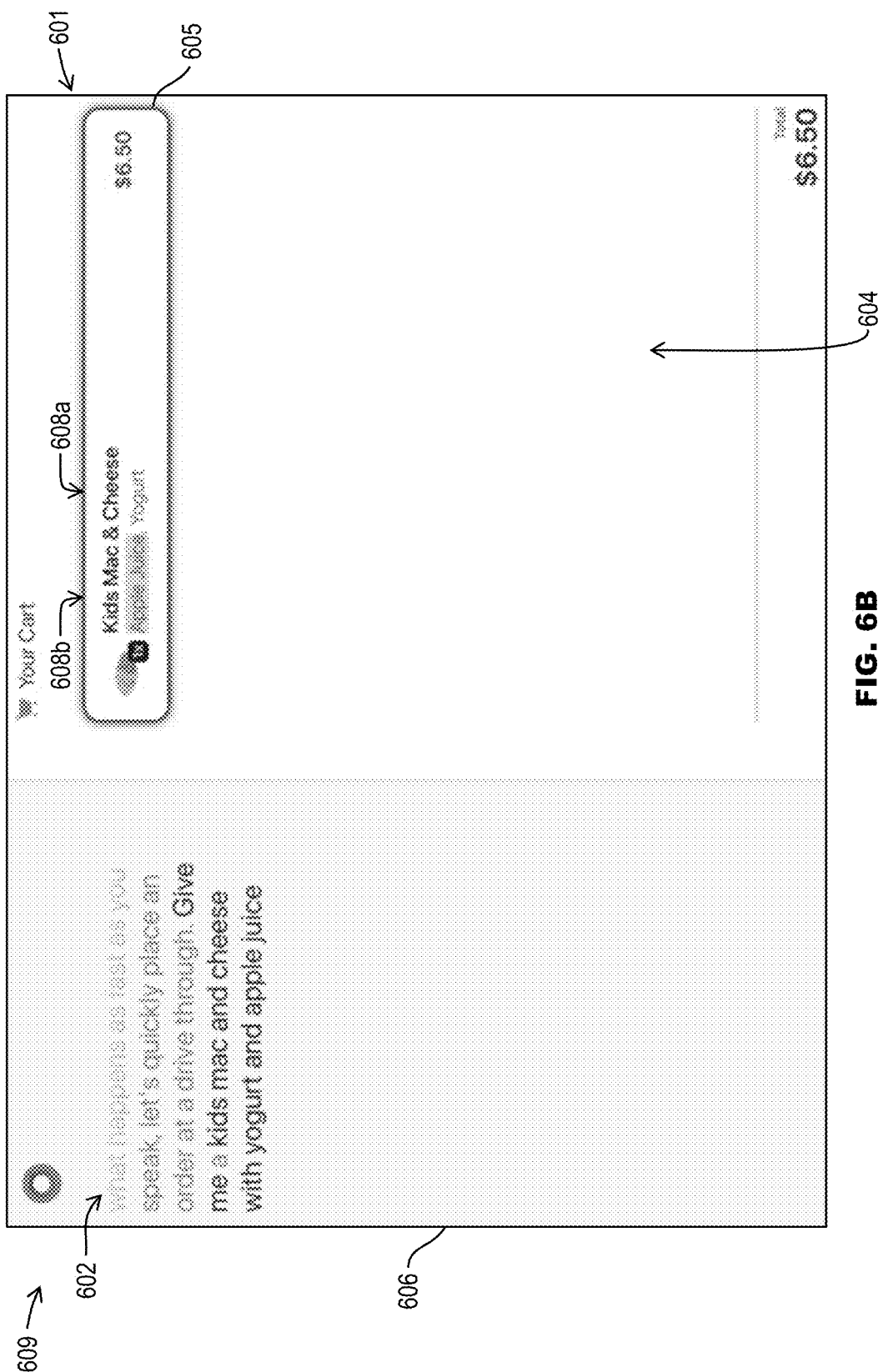
FIG. 6B is an illustration of a device showing an operational sequence that may be performed when running a semantic completion software.

FIG. 6B is an illustration of a display of device 606 showing an operational sequence 609 that may be performed when running a fragment parsing software. Semantic completion is shown, whereby the semantic state is updated 604 and displayed to a user in real time. Device 606 has user interface 601. Transcription 602 is of a portion of a user's speech in real-time. In an example, order item 605 is Kids Mac & Cheese and has the side choice 608*a* being yogurt and drink choice 608*b* being apple juice.

Figure 6C:
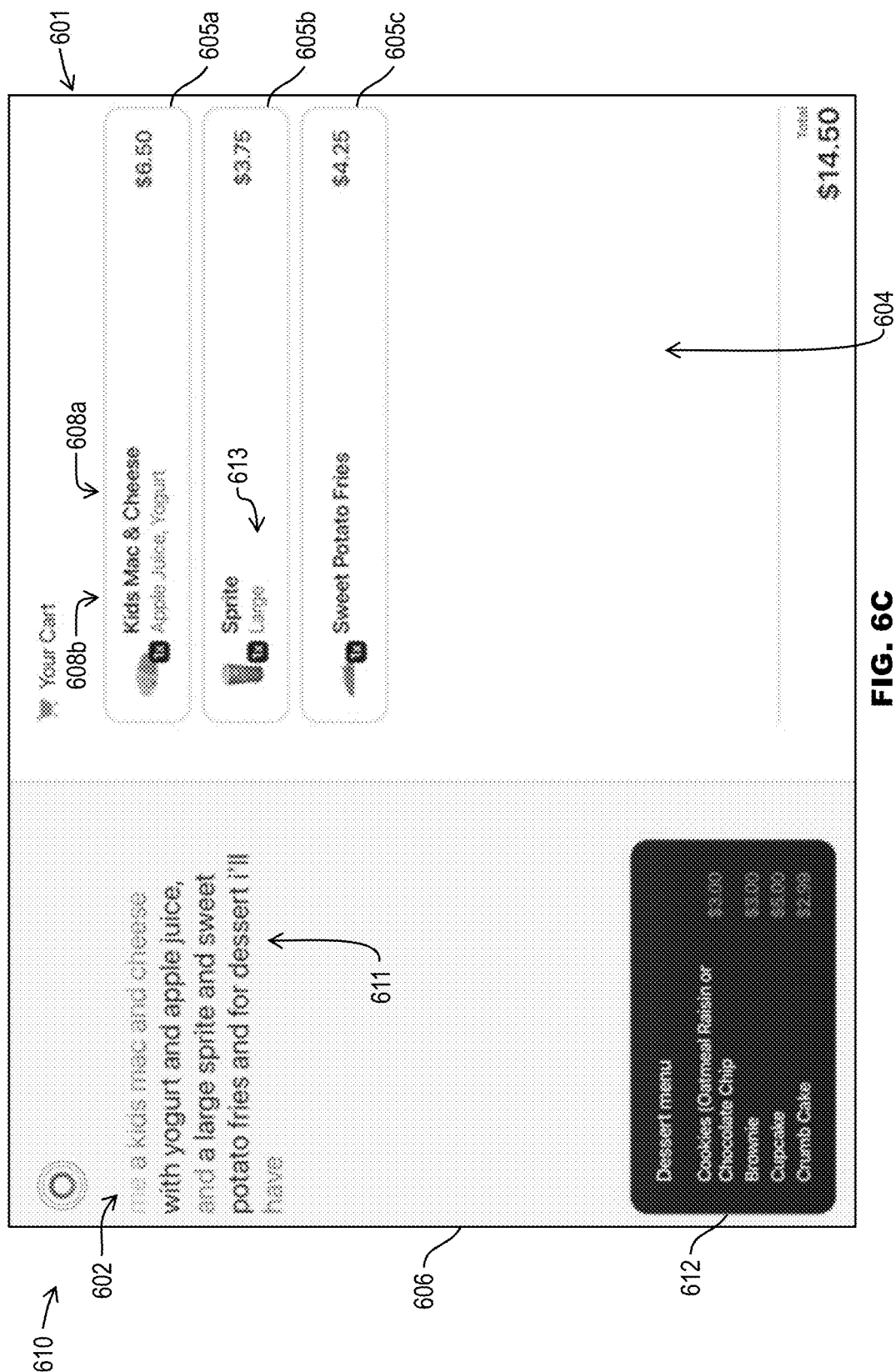
FIG. 6C is an illustration of a device showing an operational sequence that may be performed when running a semantic completion software.

FIG. 6C is an illustration of a display of device 606 showing an operational sequence 610 that may be performed when running a fragment parsing software. Semantic completion is shown, whereby the semantic state is updated 604 and displayed to a user in real time. Device 606 has user interface 601. Transcription 602 is of a portion of a user's speech in real-time. In an example, when transcription 602 includes fragment 611 "dessert" a unique dessert menu 612 appears. In an example, order item 605*a* is Kids Mac & Cheese and has the side choice 608*a* being yogurt and drink choice 608*b* being apple juice. Order item 605*b* is Sprite and has the size selection 613 being a large size. Order item 605*c* is sweet potato fries. The dessert menu is presented by the domain handler in response to the transcription matching the fragment pattern "dessert". In various embodiments, the dessert menu remains visible until another fragment pattern is matched that would invoke a special pop-up box, until a period of time passes, until the transcription matches a fragment that is a specific dessert item, or the first or last of a combination of those criteria for removing the dessert menu pop-up box.

Figure 6D:
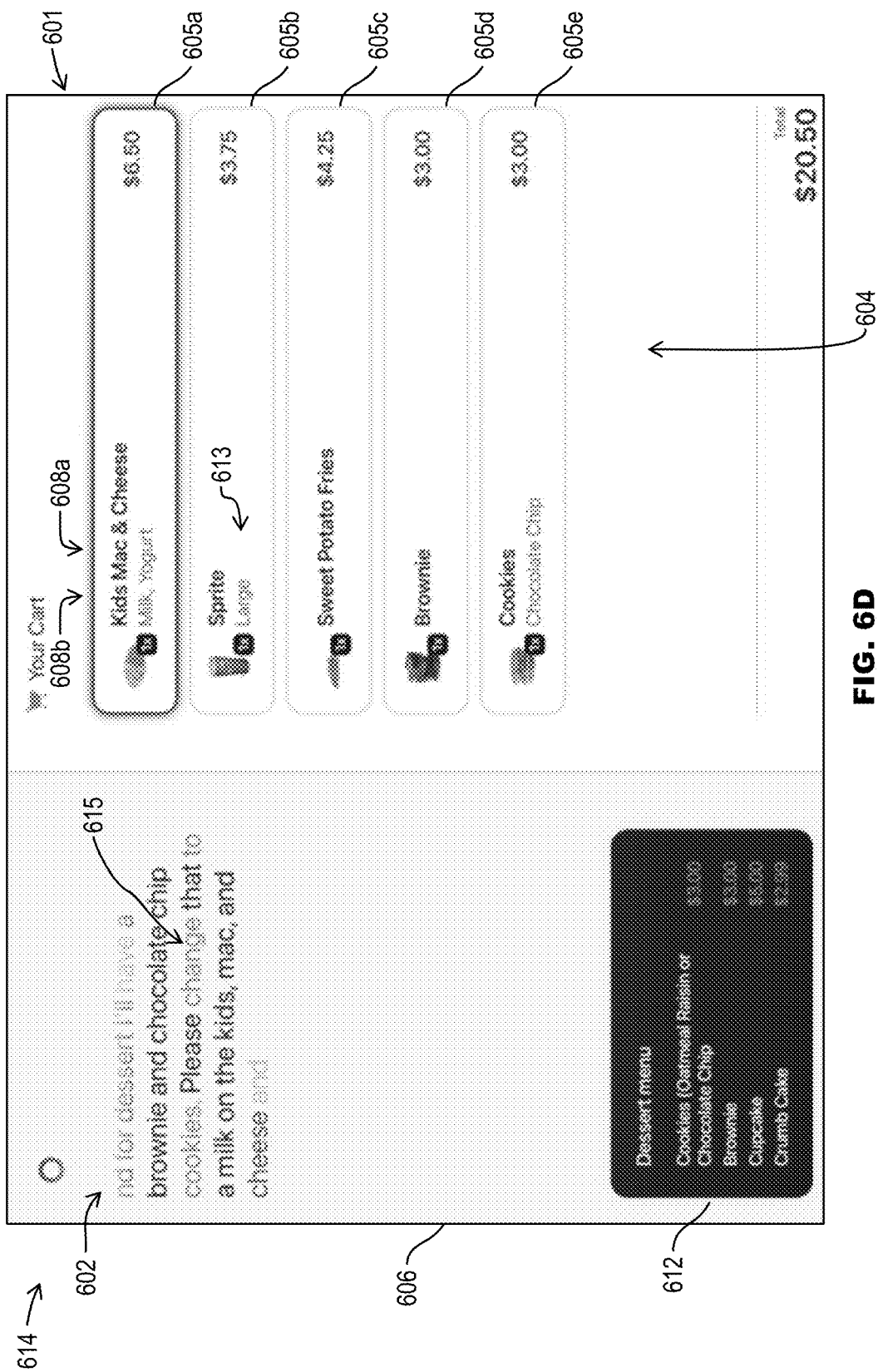
FIG. 6D is an illustration of a device showing an operational sequence that may be performed when running a semantic completion software.

FIG. 6D is an illustration of a display of device 606 showing an operational sequence 614 that may be performed when running a fragment parsing software. Semantic completion is shown, whereby the semantic state is updated 604 and displayed to a user in real time. Device 606 has user interface 601. Transcription 602 is of a portion of a user's speech in real-time. In an example of editing, when transcription 602 includes the fragment "change" followed by an unambiguous reference to an item in the semantic state (order list) "Kids Mac & Cheese", the system highlights that item. When transcription 602 also includes the word "change" 615, the system makes an edit. When the edit references a specific choice "milk" available for a drink choice 608*a* "drink", the system replaces the existing selection for the option "Apple juice" with the specified choice for the option "milk". Order item 605*d* is a brownie. Order item 605*e* is a chocolate chip cookie.

Figure 6E:
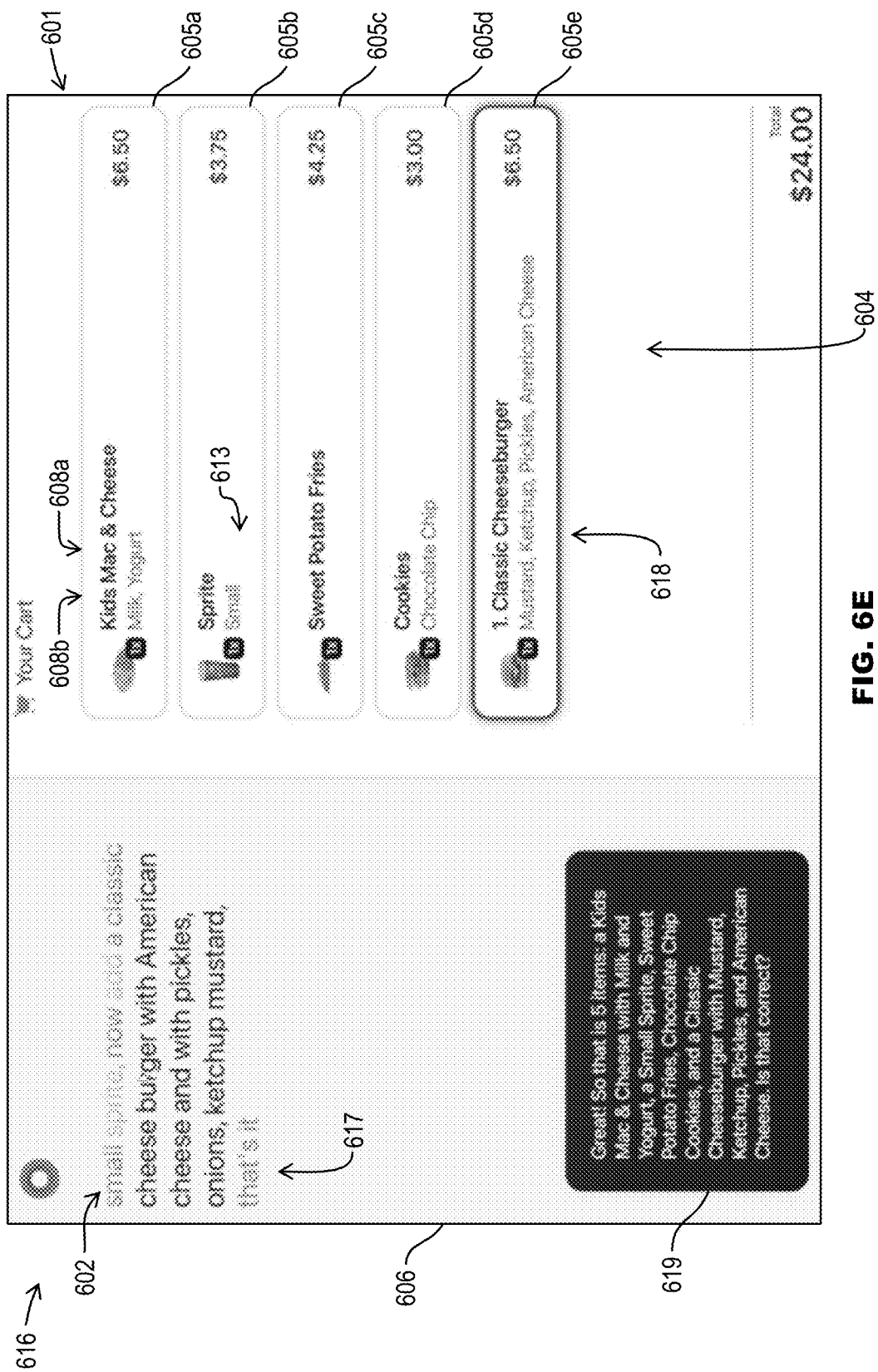
FIG. 6E is an illustration of a device showing an operational sequence that may be performed when running a semantic completion software.

FIG. 6E is an illustration of a display of device 606 showing an operational sequence 616 that may be performed when running a fragment parsing software. Semantic completion is shown, whereby the semantic state is updated 604 and ordered items 605*a*-605*e* are displayed to a user in real time. Device 606 has user interface 601. Transcription 602 is of a portion of a user's speech in real-time. In an example of completion, when the user says a command 617, "that's it", the system shows a message 618 listing the items in the order and also outputs that text 619 as text-to-speech for the user to hear. During text-to-speech, device 606 reads the words on the screen out loud to the user. Selected option 608*a* is yogurt and selected option 608*b* is milk.

At the end of operational sequence 616, the user has completed a food order at a restaurant. The system proceeds to charge their credit card for the cost of all items in their virtual shopping cart. The user may then pay for the items ordered. Operational sequence 616 shows a total of $24 US dollars. In some embodiments, payments may be made in other currencies including virtual token currencies stored on a blockchain such as Bitcoin or other distributed ledger.

Figure 7:
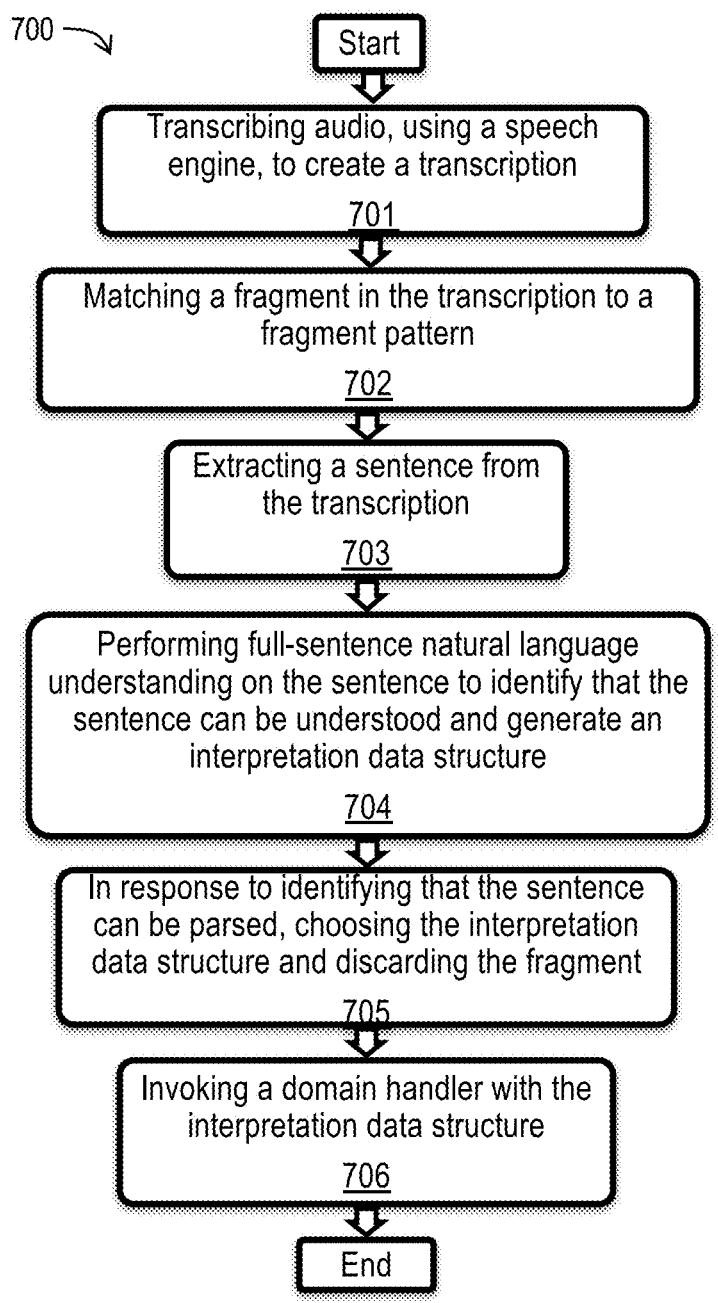
FIG. 7 is flow chart illustrating a method for processing a fragment in a natural language understanding environment.

FIG. 7 is a flow chart illustrating method 700 for processing a fragment in a natural language understanding environment. The method 700 may comprise a step 701 of transcribing audio, using a speech engine, to create a transcription.

The method 700 may also include the step 702 of matching a fragment in the transcription to a fragment pattern.

The method 700 may also include the step 703 of extracting a sentence from the transcription.

The method 700 may also include the step 704 of performing full-sentence natural language understanding on the sentence to identify that the sentence can be understood and generate an interpretation data structure.

The method 700 may also include the step 705 of in response to identifying that the sentence can be parsed, choosing the interpretation data structure and discarding the fragment.

The method 700 may also include the step 706 of invoking a domain handler with the interpretation data structure.

Some embodiments provide a platform for different product vendors such as restaurants to implement their specific menus. Such a platform can include a text or graphical configuration interface that allows a vendor to enter or upload a list of their menu of items. The configuration tool can accept, for each type of item, a set of configurable options about it and values for each option.

Finally, it should be noted that the language used in the specification has been principally selected for readability and instructional purposes and may not have been selected to delineate or circumscribe the inventive subject matter. Accordingly, the described embodiments are illustrative of the invention and are not exhaustive thereof.

As used herein, the term "computer-readable medium" shall be a non-transitory medium, including non-transitory signals, and excluding transitory signals.

Appendix 1: Pseudo Code for a Dialog Manager

This Appendix illustrates a pseudo code for a dialog manager that can perform functions including, but not limited to, composing follow-up questions to request information from a user to complete a change to the semantic state.

```
//PARAMETERS
barge_in_delay = 3 seconds //time for TTS to play before barging in is allowed
threshold_A = ? //pause from last token before full domain natural language understanding is called
threshold_B = ? //time before last update before TTS output is sent
//INITIALIZE
state = { } //empty state
head = "" //empty
partial_query = "" //empty
last_match_time = current_time
last_time_time = -1;
change=false;
no_update_time = 0;
//LOOP
while (streaming) {
   if (text input via touch interface) {
      change = false
      (new_result, new_state) = full_match ( (text_query), state)
      partial_query ="";
      head = "" //reset to empty
      state = new_state //new state from the match
      last_match_time = -1 //important so TTS is not activated with threshold_B if the user is tapping ( a threshold_C may be needed to activate eventually if a user is not taking any action)
      continue the while loop
   }
   pause_time = current_time - last_token_time;
   if (new_token) {
      partial_query . = new_token
      last_token_time = new_token_time;
      change=true
   }
   if change == true {
      if (fragmented_parsing has good results) {
         // proceed to update the cart
         change = false
         (new_result, new_state) = full_match ( "what is in my cart") , state) //note this synchronizes the state and result of fragmented parsing and a full match
         partial_query = "";
         head = "" //reset to empty
         state = new_state //new state from the match
         last_match_time = current_time
      }
      else if pause_time > threshold_A {
         change = false
         (new_result, new_state) = full_match ( (head . partial_query) , state)
         if (new_result is good) <-- note just matching is not enough, we have to detect if it's a good match (not a "sorry I didn't get that")
            partial_query = "";
            head = "" //reset to empty
            state = new_state //new state from the match
            last_match_time = current_time
         else
            head = [ 1000 head . partial_query ]
            state = state // no change
      }
   }
   if last_match_time > 0 {
      no_update_time = current_time - last_match_time; //note this doesn't get updated until there is a first match
```

```
}
if no_update_time > threshold_B {
    speak ( new_result.spoken_response, barge-in_delay) // note this is new_result
regardless of if it was good or bad, so if the user says the wrong thing and waits for a
reaction, they get a reaction to a bad input
    partial_query = "";
    head = "" //reset to empty
    state = new_state //new state from the match
    last_match_time = current_time
    }
}
```

What is claimed is:

1. A computer-implemented method comprising:
transcribing audio, using a speech engine, to create a transcription;
executing a fragment identifier on a portion of the transcription, the fragment identifier detecting a fragment and outputting the fragment;
executing a fragment integrator that receives the fragment from the fragment identifier, and matches the fragment against predefined rules; and
responsive to detecting by the fragment identifier and responsive to matching by the fragment integrator, invoking a domain handler with the fragment.

2. The method of claim 1, further comprising updating a conversation state data structure with entity values from the fragment.

3. The method of claim 1, wherein the domain handler outputs a semantic state, the method further comprising displaying context-relevant information suggesting at least one word to speak, the suggestion depending on the semantic state.

4. The method of claim 1, further comprising:
storing the fragment for a delay period, using the fragment integrator, after detecting presence, wherein invoking the domain handler occurs after the delay period.

5. The method of claim 1, wherein the domain handler causes a user interface to change on a display in real time.

6. The method of claim 1, further comprising updating, using the domain handler, a portion of a semantic state.

7. A computer-implemented method comprising:
executing a fragment identifier on a portion of speech audio, the fragment identifier inferring presence of a fragment in the portion of speech audio and outputting the fragment obtained from its mapping of fragments to the fragment; and
executing a fragment integrator that receives the fragment from the fragment identifier, and matches the fragment against predefined rules:
responsive to the execution of the fragment identifier and the fragment integrator, invoking a domain handler using the fragment.

8. The method of claim 7, further comprising updating a conversation state data structure with entity values from the fragment.

9. The method of claim 7, wherein the domain handler outputs a semantic state, the method, further comprising displaying context-relevant information suggesting at least one word to speak, the suggestion depending on the semantic state.

10. The method of claim 7, further comprising:
storing the fragment for a delay period, using the fragment integrator, after detecting the presence, wherein invoking the domain handler occurs after the delay period.

11. The method of claim 7, wherein the domain handler causes a user interface to change on a display in real time.

12. The method of claim 7, further comprising updating, using the domain handler, a portion of a semantic state.

13. The method of claim 12, wherein the semantic state causes a context-dependent bias of the fragment identifier.

14. A computer-implemented method comprising:
transcribing audio, using a speech engine, to create a transcription;
executing a fragment identifier on a portion of the transcription, the fragment identifier detecting presence of a first fragment and outputting the first fragment; and
responsive to detecting the presence, invoking a domain handler with one fragment selected from the group consisting of the first fragment and a second fragment;
wherein the domain handler's updated semantic state influences subsequent transcriptions by the speech engine.

15. The method of claim 14, further comprising updating a conversation state data structure with entity values from the fragment.

16. The method of claim 14 wherein the domain handler outputs a semantic state, the method, further comprising displaying context-relevant information suggesting at least one word to speak, the suggestion depending on the semantic state.

17. The method of claim 14, further comprising:
storing the fragment for a delay period, using a fragment integrator, after detecting the presence, wherein invoking the domain handler occurs after the delay period.

18. The method of claim 14, wherein the domain handler causes a user interface to change on a display in real time.

19. The method of claim 14, further comprising updating, using the domain handler, a portion of a semantic state.

20. The method of claim 19, wherein the semantic state causes a context-dependent bias of subsequent transcription by the speech engine.

21. A non-transitory computer-readable storage medium comprising instructions which, when executed by a computer, cause the computer to carry out the steps of:
transcribing audio, using a speech engine, to create a transcription;
executing a fragment identifier on a portion of the transcription, the fragment identifier detecting a fragment and outputting the fragment; and
responsive to detecting, invoking a domain handler with the fragment.

22. The non-transitory computer-readable storage medium of claim 21, the steps further comprising updating a conversation state data structure with entity values from the fragment.

23. The non-transitory computer-readable storage medium of claim 21, wherein the domain handler outputs a semantic state, the steps further comprising displaying context-relevant information suggesting at least one word to speak, the suggestion depending on the semantic state.

24. The non-transitory computer-readable storage medium of claim 21, the steps further comprising:
storing the fragment for a delay period, using a fragment integrator, after detecting presence, wherein invoking the domain handler occurs after the delay period.

25. The non-transitory computer-readable storage medium of claim 21, wherein the domain handler causes a user interface to change on a display in real time.

26. The non-transitory computer-readable storage medium of claim 22, the steps further comprising updating, using the domain handler, a portion of a semantic state.

27. The non-transitory computer-readable storage medium of claim 26, wherein the semantic state causes a context-dependent bias of subsequent transcription by the speech engine.

28. A non-transitory computer-readable storage medium comprising instructions which, when executed by a computer, cause the computer to carry out the steps of:
executing a fragment identifier on a portion of speech audio, the fragment identifier inferring presence of a fragment in the portion of speech audio and outputting the fragment obtained from its mapping of fragments to the fragment; and
responsive to the inferring, invoking a domain handler using the fragment.

29. The non-transitory computer-readable storage medium of claim 28, the steps further comprising updating a conversation state data structure with entity values from the fragment.

30. The non-transitory computer-readable storage medium of claim 28, wherein the domain handler outputs a semantic state, the steps further comprising displaying context-relevant information suggesting at least one word to speak, the suggestion depending on the semantic state.

31. The non-transitory computer-readable storage medium of claim 28, the steps further comprising:
storing the fragment for a delay period, using a fragment integrator, after detecting the presence, wherein invoking the domain handler occurs after the delay period.

32. The non-transitory computer-readable storage medium of claim 28, wherein the domain handler causes a user interface to change on a display in real time.

33. The non-transitory computer-readable storage medium of claim 29, the steps further comprising updating, using the domain handler, a portion of a semantic state.

34. The non-transitory computer-readable storage medium of claim 33, wherein the semantic state causes a context-dependent bias of the fragment identifier.

\* \* \* \* \*